(12) United States Patent
Hattori et al.

(10) Patent No.: US 7,401,071 B2
(45) Date of Patent: Jul. 15, 2008

(54) STRUCTURED DATA RETRIEVAL APPARATUS, METHOD, AND COMPUTER READABLE MEDIUM

(75) Inventors: Masakazu Hattori, Yokohama (JP); Hiroshi Niina, Kawasaki (JP); Takuya Kanawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 395 days.

(21) Appl. No.: 10/935,627

(22) Filed: Sep. 8, 2004

(65) Prior Publication Data

US 2005/0144153 A1 Jun. 30, 2005

(30) Foreign Application Priority Data

Dec. 25, 2003 (JP) ............................ 2003-430598

(51) Int. Cl.
G06F 7/00 (2006.01)
G06F 17/00 (2006.01)
(52) U.S. Cl. ................................ 707/3; 707/1; 707/102
(58) Field of Classification Search ............... 707/1–10, 707/102
See application file for complete search history.

(56) References Cited

U.S. PATENT DOCUMENTS

| | | | |
|---|---|---|---|
| 2001/0007987 A1* | 7/2001 | Igata | 707/3 |
| 2002/0143742 A1* | 10/2002 | Nonmura et al. | 707/1 |
| 2002/0147711 A1 | 10/2002 | Hattori et al. | |
| 2003/0101169 A1* | 5/2003 | Bhatt et al. | 707/3 |
| 2005/0114314 A1* | 5/2005 | Fan et al. | 707/3 |

FOREIGN PATENT DOCUMENTS

| | | |
|---|---|---|
| JP | 2000-57163 | 2/2000 |
| JP | 2001-34618 | 2/2001 |
| JP | 2001-34619 | 2/2001 |
| JP | 2001-147933 | 5/2001 |
| JP | 2003-271668 | 9/2003 |

OTHER PUBLICATIONS

Hattori et al.; "Structured Document Search Method, Structured Document Search Apparatus and Structured Document Search System"; U.S. Appl. No. 09/714,627, filed Nov. 17, 2000.
Notification of Reasons for Rejection issued by the Japanese Patent Office, mailed Mar. 4, 2008, in Japanese Patent Application No. 2003-430598 and English translation of Notification.

* cited by examiner

*Primary Examiner*—John R. Cottingham
*Assistant Examiner*—Kimberly Lovel
(74) *Attorney, Agent, or Firm*—Finnegan, Henderson, Farabow, Garrett & Dunner, L.L.P.

(57) ABSTRACT

A structured data retrieval apparatus stores, in a first memory, a plurality of template IDs used to identify locations of a plurality of structure elements included in a hierarchical structure, stores, in a second memory, a plurality of structured data items each of which includes a plurality of elements, each of the elements being assigned a template ID of one of the structure elements, inputs a retrieval condition which designates a first structure element of the structure elements, and a character string included in the first structure element, retrieves, from the structured data items, a structured data item including a first element which includes the character string and is assigned a first template ID of the first structure element, and outputs the structured data item retrieved.

6 Claims, 20 Drawing Sheets

```
<book>
    <title>XML database</title>
    <authors>
        <author>
            <first>Taro</first>
            <last>Tanaka</last>
        </author>
        <author>
            <first>Jiro</first>
            <last>Nakamura</last>
        </author>
    </authors>
    <abstract>
    Retrieval techniques for XML data
    </abstract>
</book>
```

FIG. 1

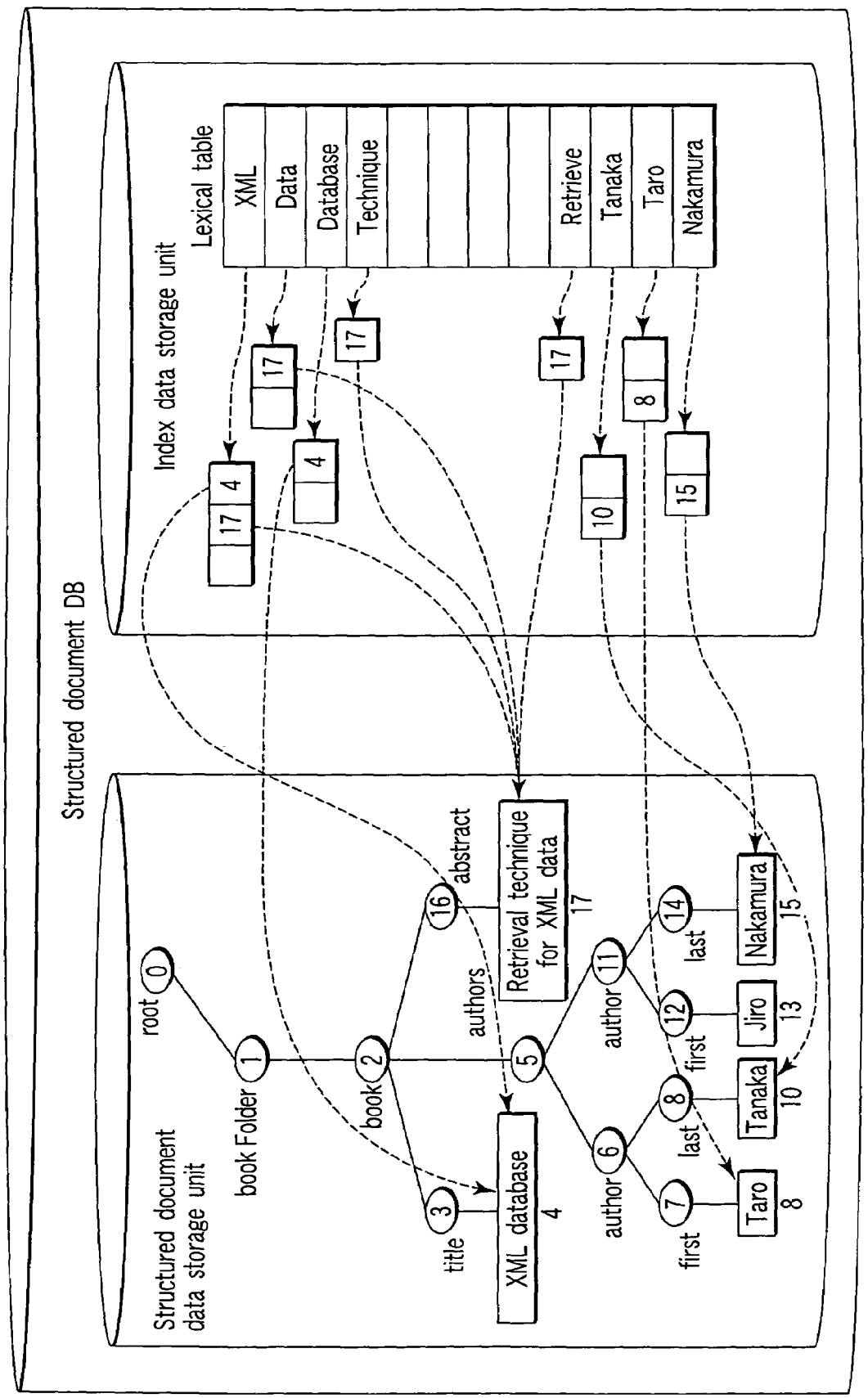
F I G. 5

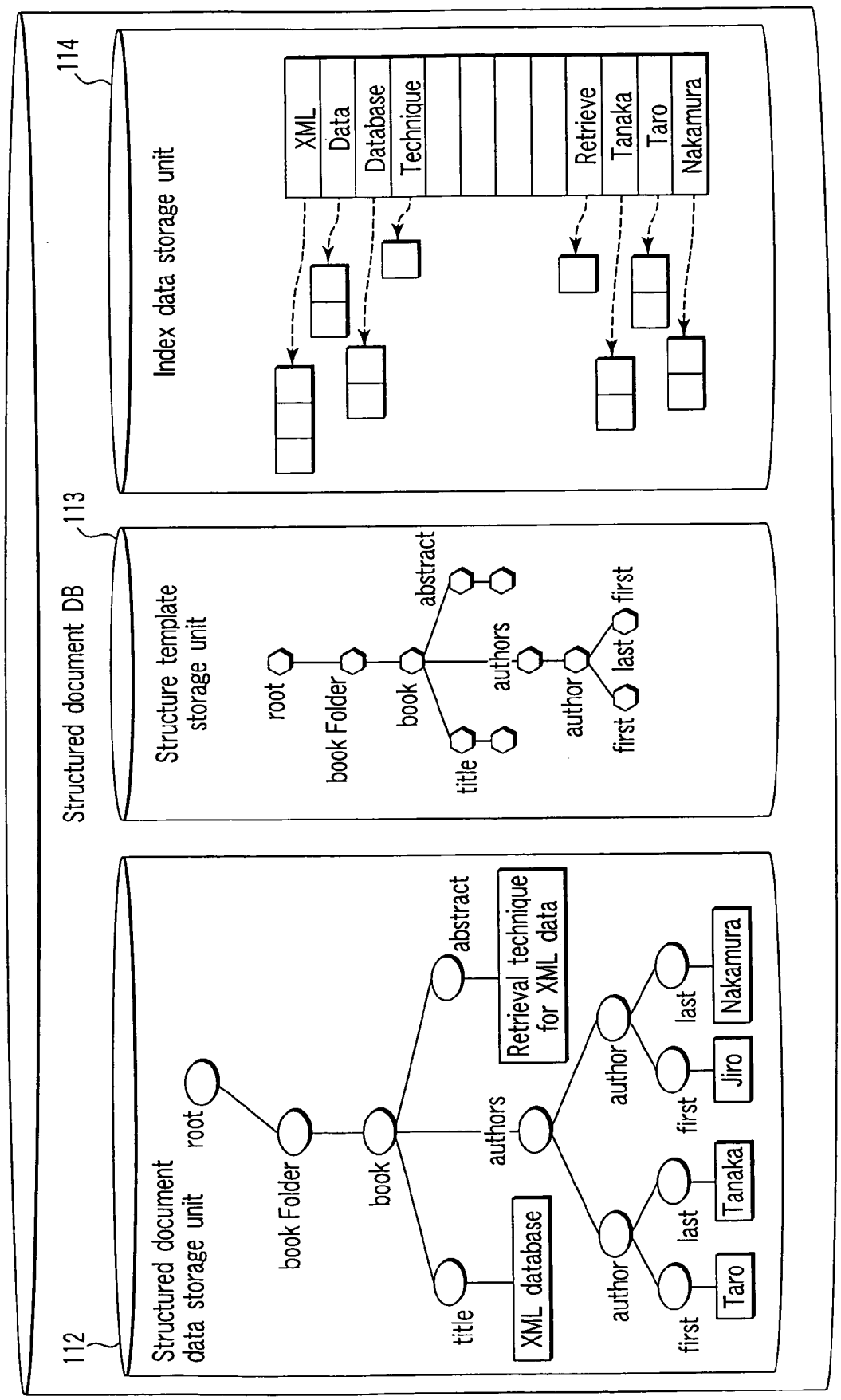
F I G. 6

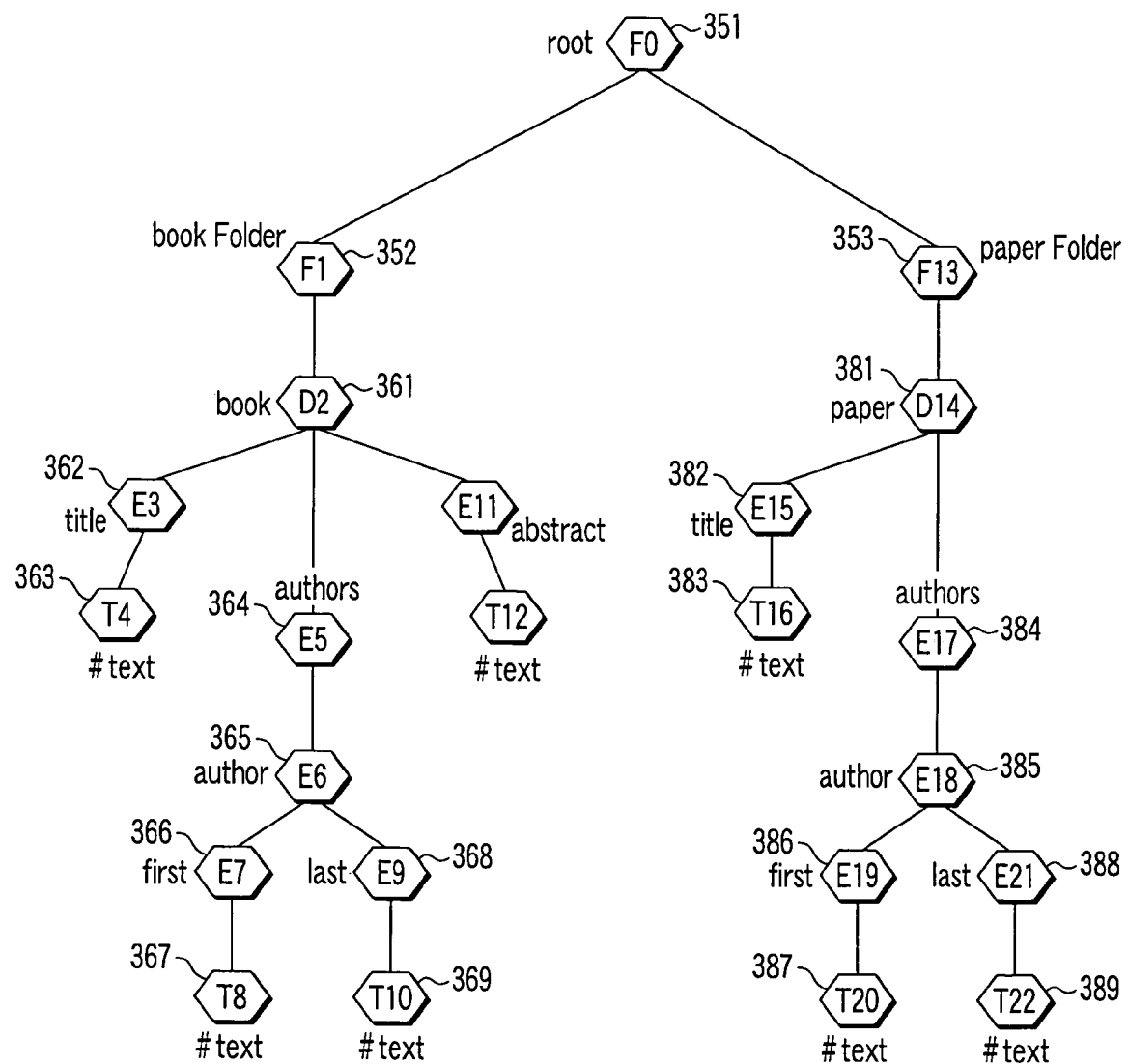
F I G. 7

Query data db("DB")//book[contains(.//last,"Tanaka)and contains(.//last,"Nakamura")]

Query graph

Query data

| db("DB")//authors[contains(.//last,"Tanaka)] |

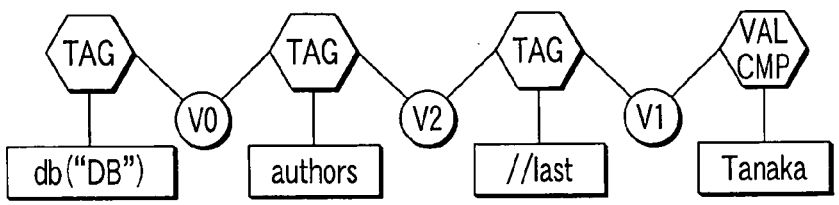
FIG. 23
FIG. 24
| V0 | V1 | V2 |
|----|----|----|
| F0 | T10 | E5 |
FIG. 25
(a) Lexical Scan With Tid ("Tanaka",{T10},Table1,V1)
(b) Scan Ancestor With Tid ({E5},Table1,V1,Table2,V2)
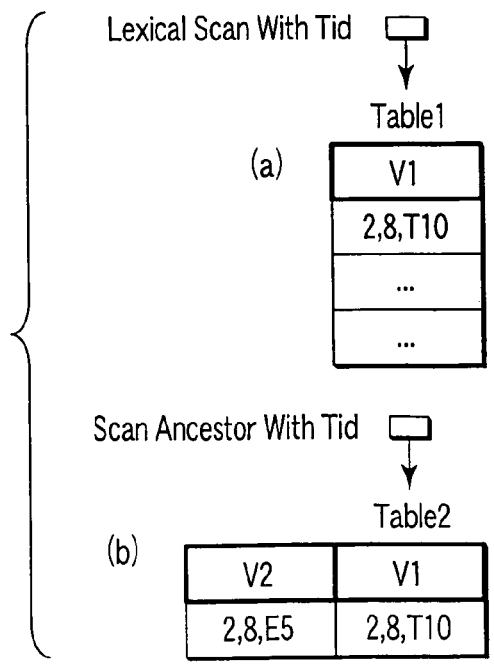
FIG. 26

STRUCTURED DATA RETRIEVAL APPARATUS, METHOD, AND COMPUTER READABLE MEDIUM

CROSS-REFERENCE TO RELATED APPLICATIONS

This application is based upon and claims the benefit of priority from prior Japanese Patent Application No. 2003-430598, filed Dec. 25, 2003, the entire contents of which are incorporated herein by reference.

BACKGROUND OF THE INVENTION

Various methods of a structured data management system that stores and retrieves structured documents described in an Extensible markup language (XML) and the like have been proposed.

(1) A method of storing structured data intact as a text file as a simple method. With this method, when the number of data and the data size increase, the storage efficiency impairs, and a retrieval process that exploits the features of structured documents becomes harder to achieve.

(2) A method of managing structured document data in an RDB (Relational Database).

(3) A method of managing structured document data using an OODB (Object Oriented Database) which has been developed to manage the structured document data. Backbone systems prevalently use the RDB, and for example, an XML compatible RDB that expands the RDB is commercially available as a product. Since the RDB stores data in a flat table format, complicated mapping is required to determine correspondence between the hierarchical structure such as XML data and the like, and the table. If prior schema design for this mapping is insufficient, performance drop may occur.

In recent years, a new method has been proposed in addition to these methods (1) to (3).

(4) A method of natively managing structured document data. This method stores XML data having various hierarchical structures without any special mapping process. For this reason, no special overhead is required upon storage or acquisition. Also, the need for prior schema design that requires high cost can be obviated, and the XML data structure can be freely changed as needed in correspondence with a change in business environment.

Even if structured document data are efficiently stored, there is no point if no means for extracting stored data is available. As such means for extracting stored data, query languages are used. XQuery (XML Query Language) has been designed for XML as in SQL (Structured Query Language) for RDB. XQuery is a language used to handle XML data like a database. For this purpose, means for extracting a data set that matches a condition, and means for compiling and parsing data are provided. Also, since XML data have a hierarchical structure as a combination of parent elements, child elements, brother elements, and the like, means for tracing such hierarchical structure is provided.

A technique for retrieving structured document data that includes a specific element and specific structure designated by a retrieval condition while tracing the hierarchical structure of the stored structured document data has already been proposed (e.g., Jpn. Pat. Appln. KOKAI Publication Nos. 2002-34618 and 2000-57163).

As the structure of the structured document data has a larger scale, the number of structured document data stored in a database is larger, and a retrieval condition becomes more complicated, a longer time is required to trace elements which form the hierarchical structure of each structured document data. Also, it is impossible to expand stored structured document data onto a memory with increasing number of structured document data and their sizes, and most of structured document data are stored in a secondary storage such as a hard disk or the like.

In the method of natively managing structured document data, the hierarchical structure among elements of the structured document data is stored intact. In order to check if an element or structure designated as a retrieval condition is included, elements of structured document data stored on the secondary storage must be frequently accessed. Still more accesses are required for a complicated retrieval condition.

Conventionally, in order to retrieve structured document data having a desired element or structure from a database that stores structured document data with the hierarchical structure, a high-speed retrieval process cannot be attained since structured document data having an element or structure designated by the retrieval condition is retrieved while tracing element which form the hierarchical structure of each structured document data in the database. Especially, it becomes more difficult to attain a high-speed retrieval process with increasing size of structured document data and increasing number of structured document data to be retrieved.

BRIEF SUMMARY OF THE INVENTION

According to embodiments of the present invention, there is provided a structured data retrieval method and apparatus, which can attain a high-speed retrieval process of structured document data.

A structured data retrieval apparatus stores, in a first memory, a plurality of template IDs used to identify locations of a plurality of structure elements included in a hierarchical structure; stores, in a second memory, a plurality of structured data items each of which includes a plurality of elements, each of the elements being assigned a template ID of one of the structure elements; inputs a retrieval condition which designates a first structure element of the structure elements, and a character string included in the first structure element; retrieves, from the structured data items, a structured data item including a first element which includes the character string and is assigned a first template ID of the first structure element; and outputs the structured data item retrieved.

A structured data retrieval apparatus stores, in a first memory, a plurality of template IDs used to identify locations of a plurality of structure elements included in a hierarchical structure; stores in a second memory, a plurality of structured data items each of which includes a plurality of elements, each of the elements being assigned a template ID of one of the structure elements; inputs a retrieval condition which designates a first structure element which is one of the structure elements, a second structure element which is another of the structure elements and includes the first structure element, and a character string included in the first structure element; retrieves, from the structured data items, a structured data item including a first element which includes the character string and is assigned a first template ID of the first structure element, and a second element which includes the first element and is assigned a second template ID of the second structure element; and outputs the structured data retrieved.

A structured data retrieval apparatus stores, in a first memory, a plurality of template IDs used to identify locations of a plurality of structure elements included in a hierarchical structure; stores, in a second memory, a plurality of structured data items, each of which includes a plurality of elements each of the elements being assigned a template ID of one of the structure elements; inputs a retrieval condition which designates a first structure element which is one of the structure elements, a second structure element which is one of the structure elements and includes the first structure element, a third element which is one of the structure elements and includes the first and second structure elements, and a character string included in the first structure element; retrieves, from the structured data items, a structured data item including a first element which includes the character string and is assigned a first template ID of the first structure element, a second element which includes the first element and is assigned a second template ID of the second structure element, and a third element which includes the first and second element and is assigned a third template ID of the third structure element; and outputs the structured data item retrieved.

BRIEF DESCRIPTION OF THE SEVERAL VIEWS OF THE DRAWING

FIG. 1 shows a practical example of structured document data;

FIG. 5 shows an example of the configuration of a conventional structured document DB;

FIG. 6 shows an example of the configuration of a structured document DB according to the embodiment of the present invention;

FIG. 7 shows an example of structure template data stored in a structure template storage unit;

FIG. 23 shows a query graph obtained from the query data shown in FIG. 22;

FIG. 24 shows TID corresponding to variables in the query graph shown in FIG. 23;

FIG. 25 shows an operator sequence used in the retrieval process based on the query graph shown in FIG. 23; and FIG. 26 is a view for explaining the processing operation based on the operator sequence shown in FIG. 25.

DETAILED DESCRIPTION OF THE INVENTION

Preferred embodiments of the present invention will be described hereinafter with reference to the accompanying drawings.

FIG. 1 shows an example of structured document data (structured data). XML (extensible Markup Language) is known as a typical language used to describe structured documents. The structured document shown in FIG. 1 is described using XML. In XML, individual parts that form a document structure are called "elements", which are described using tags. More specifically, one element is expressed by bounding text data between two tags, i.e., a tag indicating the start of the element (start tag) and a tag indicating the end of the element (end tag). Note that the text data bounded between the start and end tags is a text element included in one element expressed by these start and end tags.

In this example, a root element of elements is bounded by <book> tags. This "book" element includes three child elements bounded by <title>, <authors>, and tags. The "authors" element includes two child elements having <author> tags. Each "author" element includes child elements bounded by <first> and <last> tags. The "first" and "last" elements respectively have text elements "Taro", "Tanaka", and the like.

Figure 2:
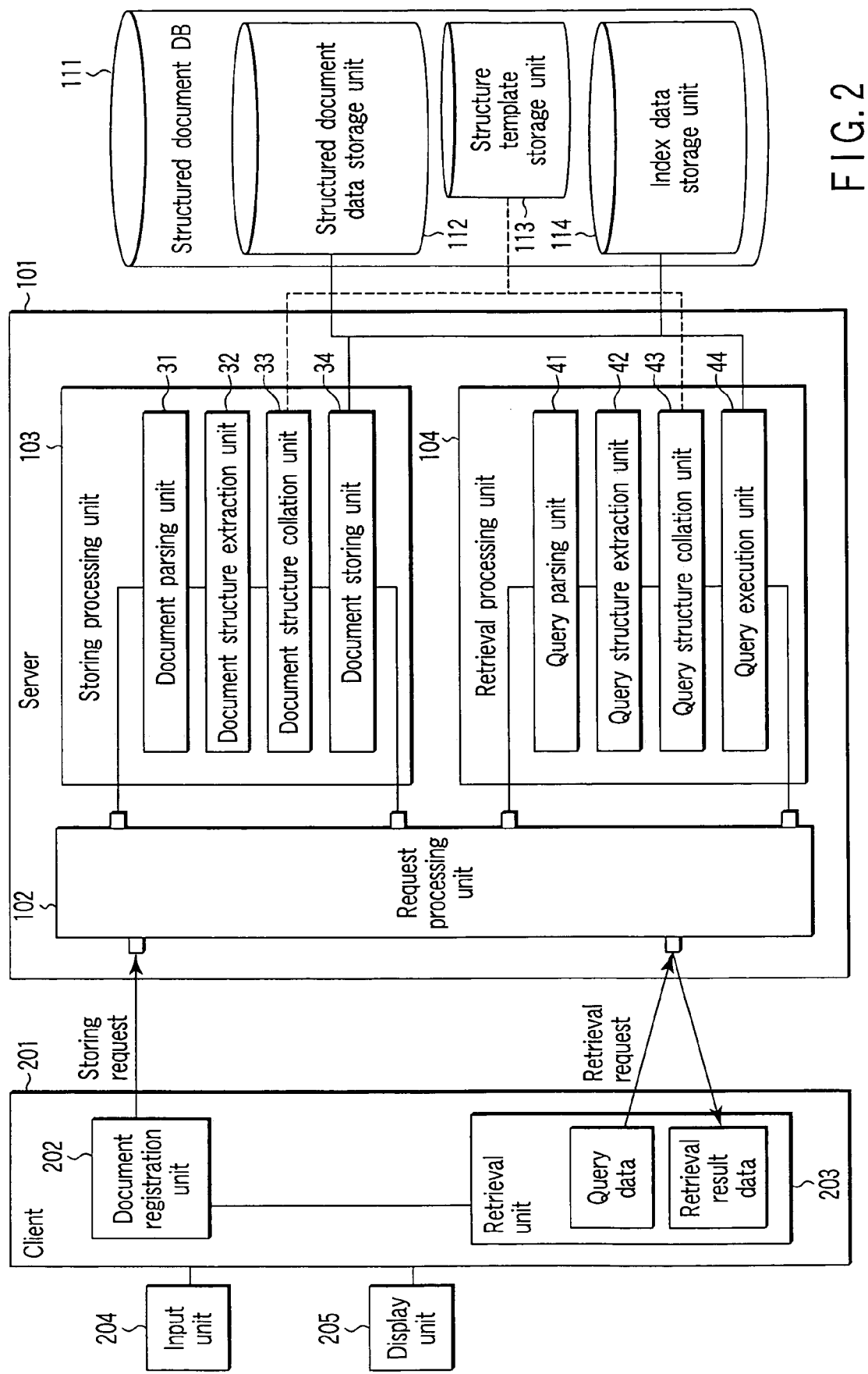
FIG. 2 is a block diagram showing an example of the functional arrangement of a document management system according to an embodiment of the present invention.

FIG. 2 shows an example of the functional arrangement of a structured document management system according to this embodiment. The structured document management system roughly comprises a client 201 and server 101. In response to a storing request or retrieval request from the client 201, the server 101 executes a process corresponding to such request.

The client 201 mainly comprises a structured document registration unit 202, retrieval unit 203, input unit 204, and display unit 205. The input unit 204 comprises input devices such as a keyboard, mouse, and the like, and is used to input a structured document and various instructions. The structured document registration unit 202 registers a structured document input from the input unit 204 and that which is pre-stored in a storage device or the like of the client 201 in a structured document database (structured document DB) 111. The structured document registration unit 202 transmits a storing request to the server 101 together with a structured document to be registered.

The retrieval unit 203 generates query data which describes a retrieval condition and the like used to retrieve desired data from the structured document database 111 in accordance with an instruction input by the user from the input unit 204, and transmits a retrieval request including the query data to the server 101. Also, the retrieval unit 203 receives retrieval result data corresponding to the transmitted retrieval request from the server 101, and displays it on the display unit 205.

The server 101 comprises a request processing unit 102, storing processing unit 103, and retrieval processing unit 104. Also, the structured document database 111 is connected to the server 101. The structured document database 111 comprises a structured document data storage unit 112, structure template storage unit 113, and index data storage unit 114.

The request processing unit 102 discriminates the storing request and retrieval request transmitted from the client 201, and distributes processes to the storing processing unit 103, retrieval processing unit 104, and the like. Also, the request processing unit 102 returns the processing results of the storing processing unit 103 and retrieval processing unit 104 to the client 201.

The storing processing unit 103 executes a process for storing a structured document transmitted from the client 201 in response to the storing request received from the client 201. The storing processing unit 103 comprises a document parsing unit 31, document structure extraction unit 32, document structure collation unit 33, and document storing unit 34.

The document parsing unit 31 parses a structured document passed from the request processing unit 102, and the document structure extraction unit 32 extracts the (document) structure of the structured document on the basis of the parsing result. The document structure collation unit 33 collates the extracted structure with structure templates stored in the structured document database 111. The document storing unit 34 stores data of the structured document in the structured document data storage unit 112 of the structured document database 111 on the basis of the collation result of the document structure collation unit 33, and stores index data in the index data storage unit 114.

The retrieval processing unit 104 executes a process for retrieving data that matches the designated condition (query data) from the structured document database 111 upon reception of the retrieval request from the client 201, and returning the retrieved data as retrieval result data. The retrieval processing unit 104 comprises a query parsing unit 41, query structure extraction unit 42, query structure collation unit 43, and query execution unit 44.

The query parsing unit 41 parses query data passed from the request processing unit 102, and the query structure extraction unit 42 extracts the structure of that query data on the basis of the parsing result. The query structure collation unit 43 collates the extracted structure with structure templates stored in the structured document database 111. The query execution unit 44 accesses structured document data, structure templates, and lexical index data stored in the structured document database 111 on the basis of the collation result of the query structure collation unit 43, and generates retrieval result data which matches the condition described in the query data.

Figure 3:
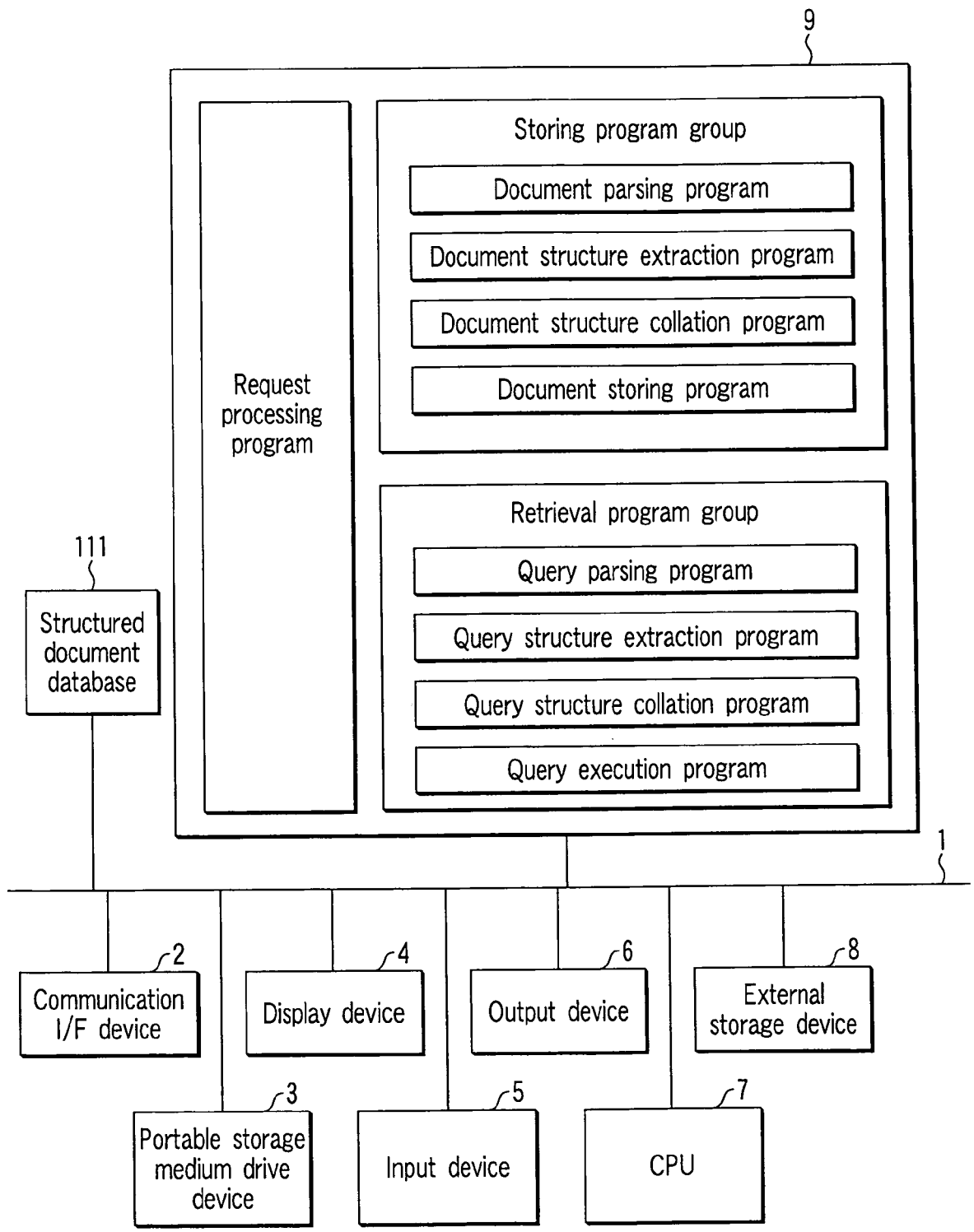
FIG. 3 is a block diagram showing an example of the hardware arrangement of a server.

FIG. 3 shows an example of the hardware arrangement of the server 101. To a bus 1, a communication I/F device 2, portable recording medium drive device 3, display device 4, input device 5, output device 6, arithmetic device (CPU) 7, external storage device 8, and memory 9 are connected. Furthermore, in the arrangement shown in FIG. 3, the structured document database 111 in FIG. 2 is connected to the bus 1.

Programs, which respectively implement the functions of the request processing unit 102, storing processing unit 103, and retrieval processing unit 104 in FIG. 2, are pre-stored in the external storage device 8 in FIG. 3, and are loaded onto the memory 9 as needed when they are executed.

The following description will be given with reference to FIG. 2.

The storage method of a structured document in the structured document DB 111 will be described first.

Figure 4:
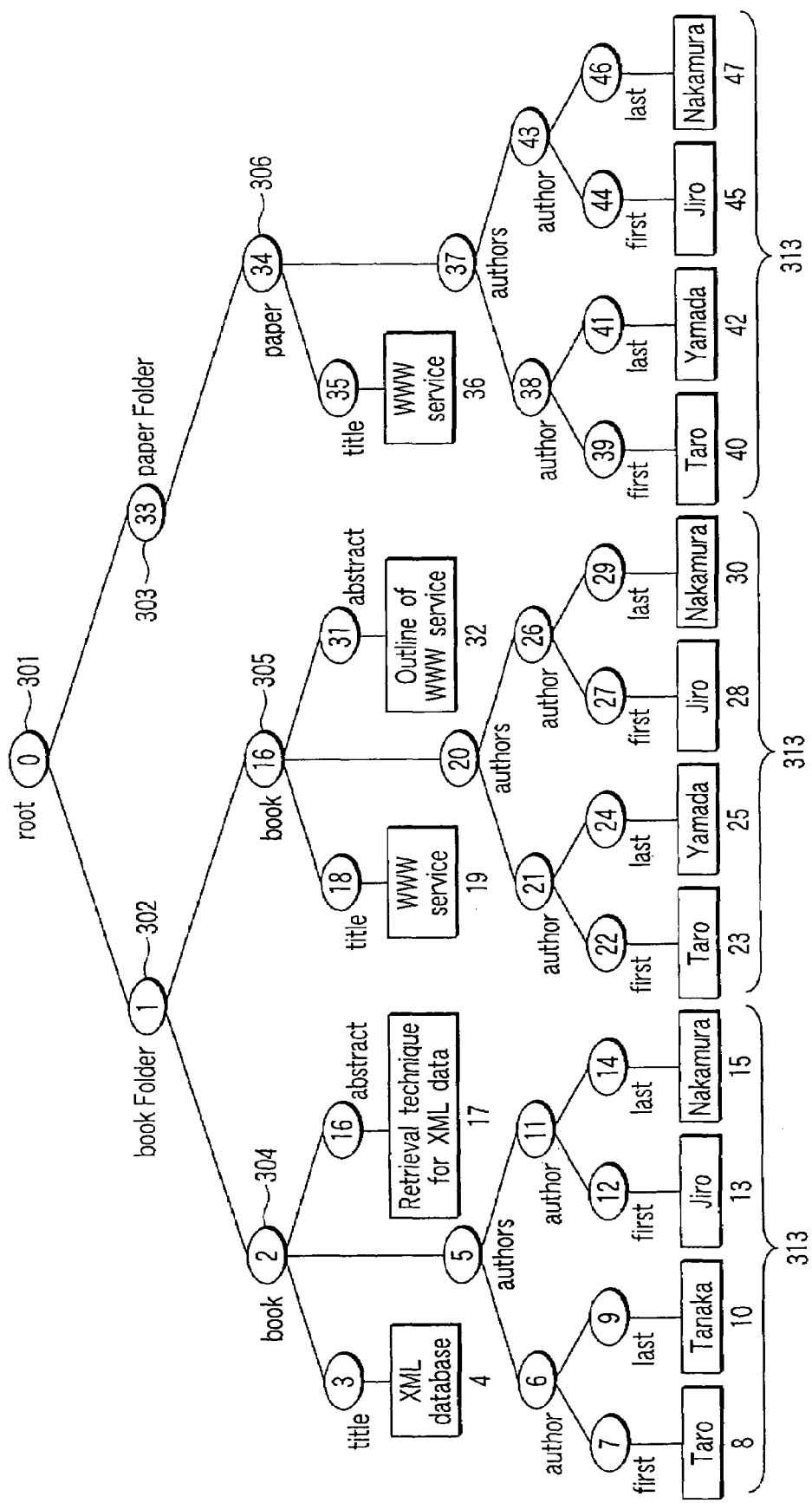
FIG. 4 illustrates the data structure of a structured document data storing unit.

FIG. 4 illustrates the data structure of the structured document data storage unit 112. The structured document data storage unit 112 logically stores a large number of structured documents as partial documents of one structured document having a "root" node 301 as a root. FIG. 4 expresses the structure of one structured document having the "root" node 301 as a root by a hierarchical tree formed of nodes and arcs. Each node indicates an element (including a text element) of a structured document, and an arc indicates the parent-child relationship between elements. Upon implementation, nodes are stored in the structured document data storage unit 112 as files of object data. Identifiers called object IDs (OIDs) are assigned to respective nodes. Note that FIG. 4 shows the OIDs as numerals "0" to "47" for the sake of simplicity. By designating the OID, desired object data can be extracted.

The arcs which represent the parent-child relationship among nodes are links among object data, which are stored in the structured document data storage unit 112 as an OID sequence indicating an object set of child elements in object data.

There are two nodes, i.e., "bookFolder" and "paperFolder" nodes 302 and 303 under the "root" node 301. There are two "book" nodes 304 and 305 under the "bookFolder" node. The "book" node with the OID "2" stores the structured document data shown in FIG. 1.

In this manner, data under the "root" node form one large structured document data which includes elements of a plurality of structured documents. The structured document data shown in FIG. 1 is stored as a part of the large structured document data. For example, the structured document <book> . . . </book> in FIG. 1 can be expressed by <root><bookFolder><book> . . . </book></bookFolder><root> in the structured document shown in FIG. 4.

When such hierarchical structure including a plurality of nodes is applied to a directory structure which is prevalently adopted in a versatile OS, these nodes correspond to folders and files in the directory structure. That is, the hierarchical structure shown in FIG. 4 is stored in the structured document data storage unit 112 to have a directory structure which include two child folders "bookFolder" and "paperFolder" under a "root" folder, two document files 311 and 312 having a "book" element as a root under the "bookFolder" folder, and one document file 313 having a "paper" element as a root under the "paperFolder" folder.

In the following description, the "root" node, "bookFolder" node, and "paperFolder" node will be interpreted as folders, and data under these folders will be interpreted as document files together. For example, in case of FIG. 4, it can be interpreted that the "bookFolder" folder stores two "book" documents (files 311 and 312), and the "paperFolder" folder stores one "paper" document (file 313).

FIG. 5 shows an example of the configuration of a conventional structured document DB. In order to execute a retrieval process of the structured document DB, query data must be given. The query data includes one which designates text (a character string such as a word or the like) as a retrieval condition, one which designates the structure of a structured document as a retrieval condition, and one which designates a combination of them as a retrieval condition. When the query data includes a character string such as a word or the like as a retrieval condition, the structured document management system often assigns a lexical index to attain a high-speed retrieval process. The lexical index data is information which is used to extract text data (character string) in text elements included in stored structured document data, and indicates correspondence between the text data and the object ID (OID) of elements in structured document data including the text data.

The structured document DB shown in FIG. 5 comprises a structured document data storage unit which stores structured document data, and an index data storage unit which stores index data.

The structured document data shown in FIG. 1 include text data such as "XML database", "retrieval technique for XML data", "Tanaka", and the like. When these text data are decomposed into lexical items (character strings) "XML", "data", "database", and the like via lexical analysis.

The index data storage unit stores a lexical table that records a plurality of lexical items, and stores each OIDs of text element that includes and linked with the one of the lexical items in the lexical table. By tracing a link from a given lexical item in the lexical table, the position of appearance of a text element including that lexical item, i.e., the OID, can be obtained.

FIG. 6 shows an example of the configuration of the structured document DB 111 according to this embodiment. The structured document DB 111 has the structure template storage unit 113 in addition to the structured document data storage unit 112 and index data storage unit 115 as in FIG. 5.

The structure template storage unit 113 stores structure template data. The structure template storage unit 113 stores structure data extracted from structured document data stored in the structured document data storage unit 112.

FIG. 7 shows structure template data stored in the structure template storage unit 113 when the structured document DB 111 stores two "book" document files 311 and 312 and one "paper" document file 313, as shown in FIG. 4. In FIG. 4, the folders and document files are hierarchically arranged. The structure template data shown in FIG. 7 represents the hierarchical structure including three folders, i.e., "root", "bookFolder", and "paperFolder" folders 351 to 353, base (reference) document structures (hierarchical structures including elements (including text elements) 361 to 369) of the document structures of two documents stored in the "bookFolder" folder, and a base (reference) document structure (hierarchical structure including elements (including text elements) 381 to 389) of the document structure of one document stored in the "paperFolder" folder.

In FIG. 4, the "book" document file 311 has an "authors" node immediately under the "book" node 304 as its start node, and two "author" nodes under that "authors" node. However, in the structure template shown in FIG. 7, the "author" nodes are combined into one node, and text nodes (text elements) are expressed by "#text" nodes.

Nodes (which correspond to folders, files, elements, and text elements) expressed by hexagons of the structure template data shown in FIG. 7 are assigned unique IDs "F0", "D2", "E3", "T4", and the like. The IDs, which are assigned to the respective nodes so as to identify the types and positions on the structure of respective nodes of the structure template data, will be referred to as template IDs (TIDs) hereinafter.

The template ID will be described below. The template ID includes information which indicates the type of node of interest on the structure template, and a number which is used to identify each node among nodes of the same type. The node types are expressed by four letters "F", "D", "E", and "T". "F" represents a folder, "D" represents a document file, "E" represents an element (which is not a text element), and "T" represents a text element. With the template ID which includes the letter indicating the node type and the following number "x", the node corresponding to the template ID can be identified which of nodes on the structure template and the type of node.

A node with a template ID "Fx" represents a folder, and is called a folder type structure template node. A node with a template ID "Dx" represents a document, and is called a document type structure template node. A node with a template ID "Ex" represents an element (which is not a text element) in the document, and is called an element type structure template node. A node with a template ID "Tx" represents a text element in the document, and is called a text type structure template node. Note that "x" is a serial integer which is unique to each node of the structure template data.

In the structured document data storage unit 112 according to this embodiment, the OIDs used to identify nodes corresponding to the "root" node 301, "bookFolder" node 302, "paperFolder" node 303 (FIG. 4), and elements (including text elements) such as the "book" documents and "paper" document include the structure templates, as shown in FIG. 7.

Figure 8:
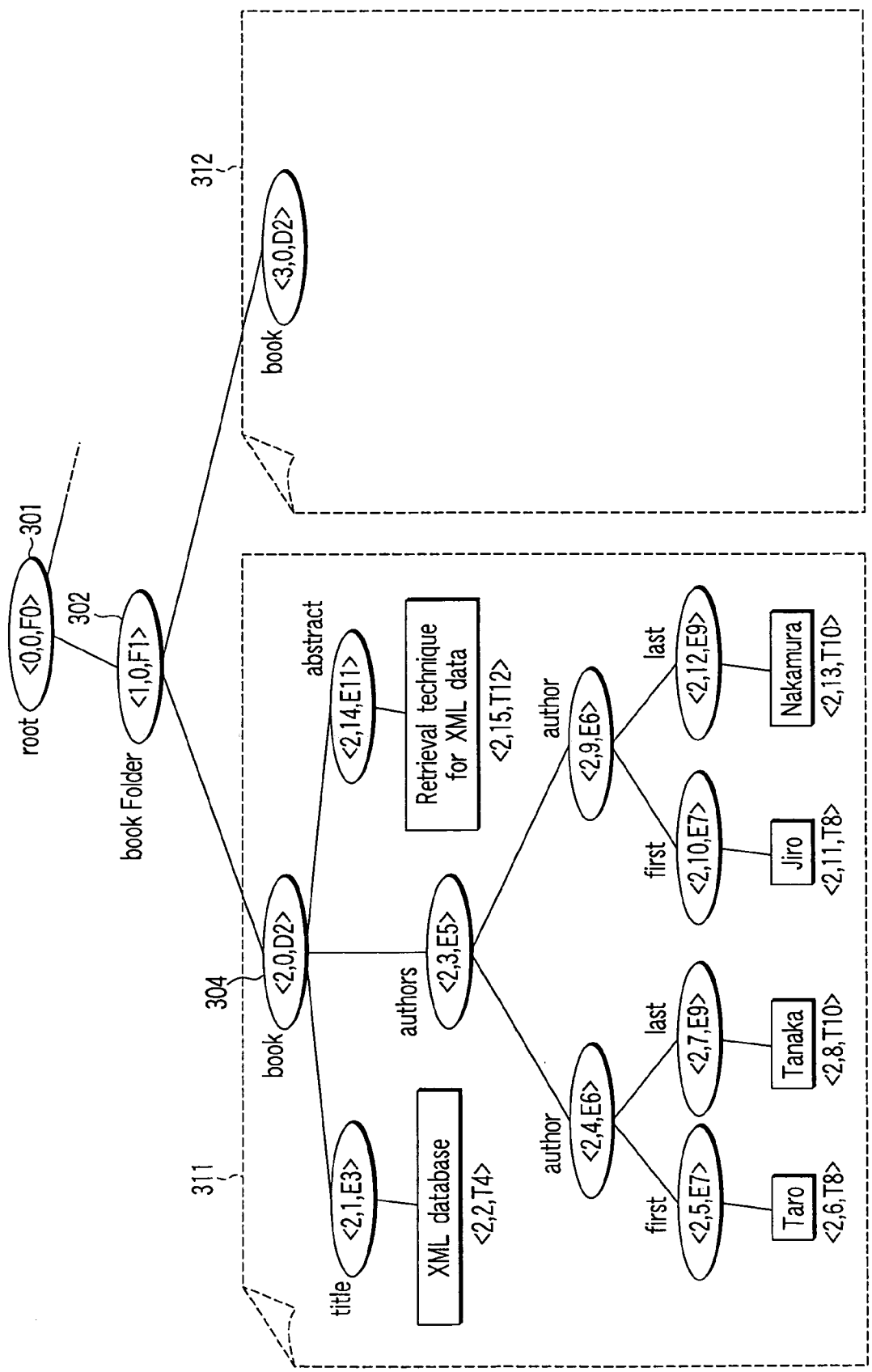
FIG. 8 illustrates a storage example of structured document data stored in a structured document data storage unit.

FIG. 8 illustrates a storage example of structured document data stored in the structured document data storage unit 112 as in FIG. 4. FIG. 8 shows the OIDs of respective nodes in more detail than FIG. 4. That is, in this embodiment, the OID of each node of structured document data stored in a data file includes a document ID (DocID), an element ID (ElemID), and the template ID (TID). In this embodiment, the OID is expressed by <DocID, ElemID, TID>.

The DocID is a unique ID in a data file, which is assigned to a document or folder, and is an identifier of a document file or folder. The ElemID is a unique ID in each document, which is assigned to each element in the document. The TID is the ID of a node in the structure template data, i.e., the template ID, as described above.

For example, the "root" node has a DocID "0", the "bookFolder" node has a DocID "1", and the two "book" nodes respectively have DocIDs "2" and "3". Furthermore, the "paperFolder" node and "paper" node have DocIDs which assume unused values other than "0" to "3" above (not shown in FIG. 8). In this manner, with the DocID, each of folders and document files in the data file can be identified.

Respective elements (including text elements) in the "book" document under the "book" node with the DocID "2" are assigned ElemIDs "0" to "15". With this ElemID, each element in the document can be identified.

Furthermore, respective elements (including text elements) in the "book" document under the "book" node with the DocID "2" are assigned the TIDs of nodes corresponding to these elements in the structure template shown in FIG. 7.

In this manner, by checking the OID of an arbitrary element in a document file, that document file including a node with that OID can be identified based on the DocID included in the OID, and the location of the node in the structure template and node type can be identified based on the TID included in the OID.

For example, a text node (text element) "XML database" included in the "book" document 311 in FIG. 8 has an OID <2, 2, T4>. As can be seen from this OID, the DocID of the document 311 to which this text node belongs is "2". Also, the text node has an ElemID "2" in that document 311. Furthermore, this text node corresponds to a node having a TID "4" in FIG. 7 in the structure template data.

As described above, according to this embodiment, each element of a structured document stored in the structured document DB 111 is identified by the OID which includes the DocID as the identifier of a folder or file to which that element belongs, the ElemID used to identify that element in the file to which the element belongs, and the TID as the identifier on the structure corresponding to that element.

Figure 9:
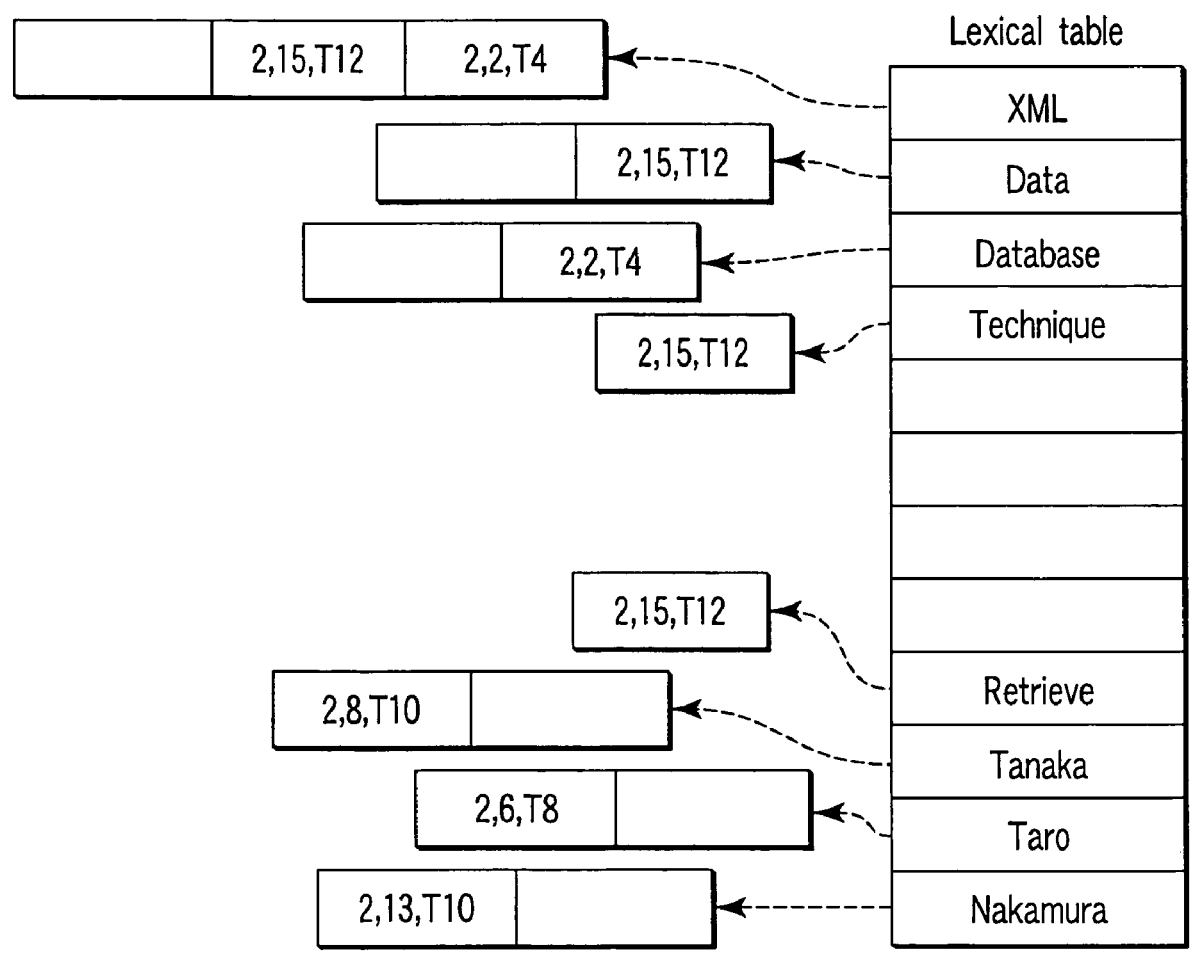
FIG. 9 shows the data structure of index data stored in an index data storage unit.

FIG. 9 illustrates the data structure of index data stored in the index data storage unit 114 according to this embodiment. The index data storage unit 114 stores a lexical table that records a plurality of lexical items, and stores each OIDs of text element which includes and linked with the one of the lexical items in the lexical table. By tracing a link from a given lexical item in the lexical table, the position of appearance of a text element including that lexical item, i.e., the OID, can be obtained.

The difference between index data shown in FIG. 9 and that shown in FIG. 5 is that the OID of the index data show in FIG. 9 is expressed by three IDs, i.e., <DocID, ElemID, TID>.

Figure 10:
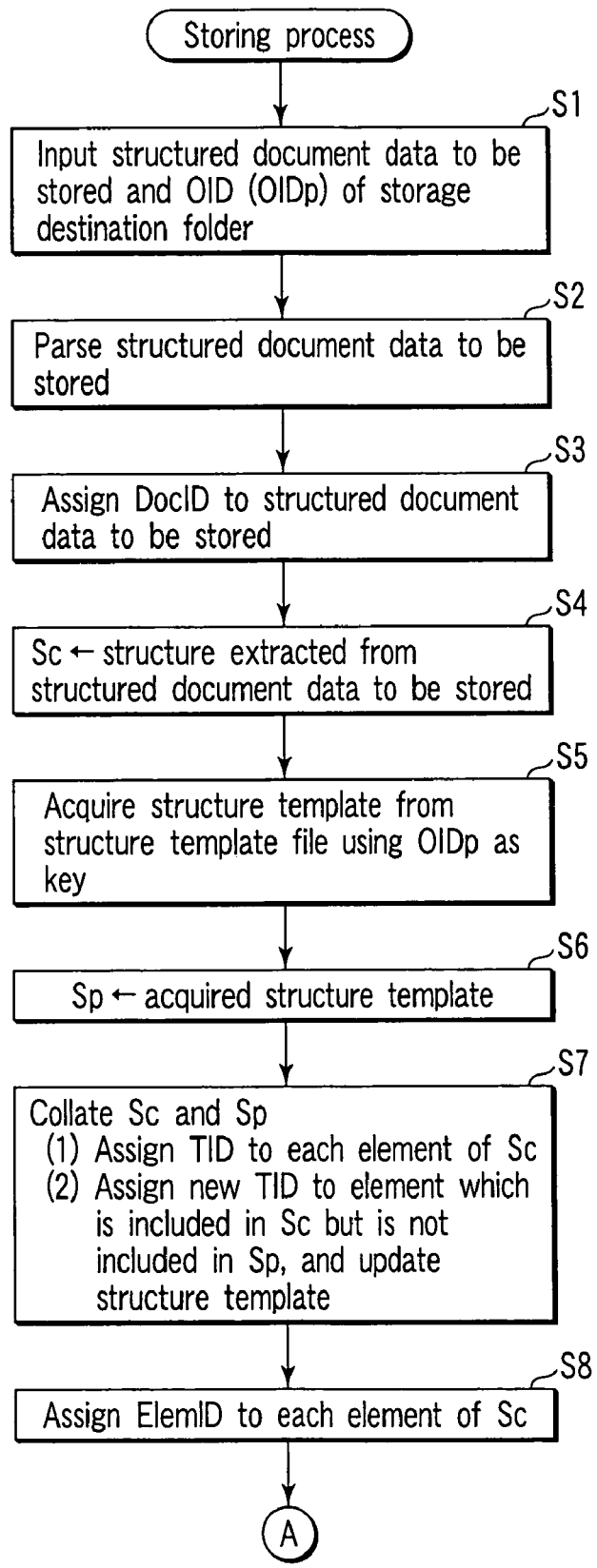
FIG. 10 is a flowchart for explaining the processing operation of a storing processing unit.

The processing operation of the storing processing unit 103 in FIG. 2 will be described below with reference to the flowcharts shown in FIGS. 10 and 11.

The structured document registration unit 202 of the client 201 transmits a structured document to be stored, and a storing request message which includes the OID of a folder as the storage destination of this structured document. Note that OIDp represents the OID of the storage destination folder.

Note that the client 201 can obtain the OID of the storage destination folder as follows. The retrieval unit 203 of the client 201 has a GUI used to display a schematic structure of the structured document DB 111 shown in, e.g., FIG. 8. When the user designates a desired node (folder) as the storage destination folder from the structure displayed via the GUI, query data required to obtain the OID corresponding to that node is generated, and is transmitted to the server 101. The server 101 acquires the OID of the designated node based on the query data, and returns it to the retrieval unit 203 of the client 201. The retrieval unit 203 passes the obtained OID (i.e., OIDp) to the structured document registration unit 202.

The request processing unit 102 of the server receives a storing request message which includes a structured document to be stored and the OIDp of the storage destination folder (step S1). A case will be examined below wherein, for example, the OIDp (<1, 0, F1>) corresponding to the "bookFolder" 302 is designated as the storage destination folder, and the new document is to be stored under this folder.

The structured document to be stored, which is included in the storing request message, is passed to the document parsing unit 31 of the storing processing unit 103, and is parsed. As a result, a hierarchical structure including a plurality of object data of the structured document is obtained, and is expanded on the memory (step S2). More specifically, the document parsing unit 31 has a function corresponding to an XML parser which applies a parsing process to the structured document as XML data to map that data into object data in the DOM (Document Object Model) format.

Furthermore, a new document ID (DocID) is assigned to that new structured document (step S3).

The document structure extraction unit 32 extracts the structure of the structured document, i.e., a plurality of nodes corresponding to elements in the structured document and a structure which includes the plurality of nodes, by tracing the parsing result of the document parsing unit 31 from its root. Let Sc be the structure of the structured document (step S4).

The document structure collation unit 33 acquires a structure from the structure template storage unit 113 using the OIDp of the storage destination folder as a key. For example, if the OIDp is <1, 0, F1>, the unit 33 acquires the TID "F1". Let TIDp be the TID acquired from this OIDp. The document structure collation unit 33 acquires a corresponding structure by scanning the structure template storage unit 113 using the TIDp as a key (step S5). Let Sp be the acquired structure (step S6).

The document structure collation unit 33 collates Sc and Sp (step S7). This process is implemented by simple matching between trees. That is, if a structure element of Sp corresponding to that of Sc is found, the TID of the structure element of Sp is assigned to that of Sc. If no structure element of Sp corresponding to that of Sc is found, a new TID is assigned to the element which is not included in Sp but is included in Sc, and that new element is added to Sp. Also, the new TID is assigned to the new element of Sc. This operation is repeated for all structure elements of Sc.

The document structure collation unit 33 assigns element IDs (ElemIDs) to respective elements of Sc (step S8). For example, the unit 33 assigns the ElemIDs to respective elements while tracing the structure of Sc downstream from the root node.

With the above process, the OID <DocID, ElemID, TID> is assigned to each element in Sc. For example, the OID of a root object of the structured document to be stored is <DocID, 0, TID>.

Finally, the document storing unit 34 stores the updated Sp in the structure template storage unit 113. In this manner, the structure template stored in the structure template storage unit 113 is updated.

Figures 11, 12:
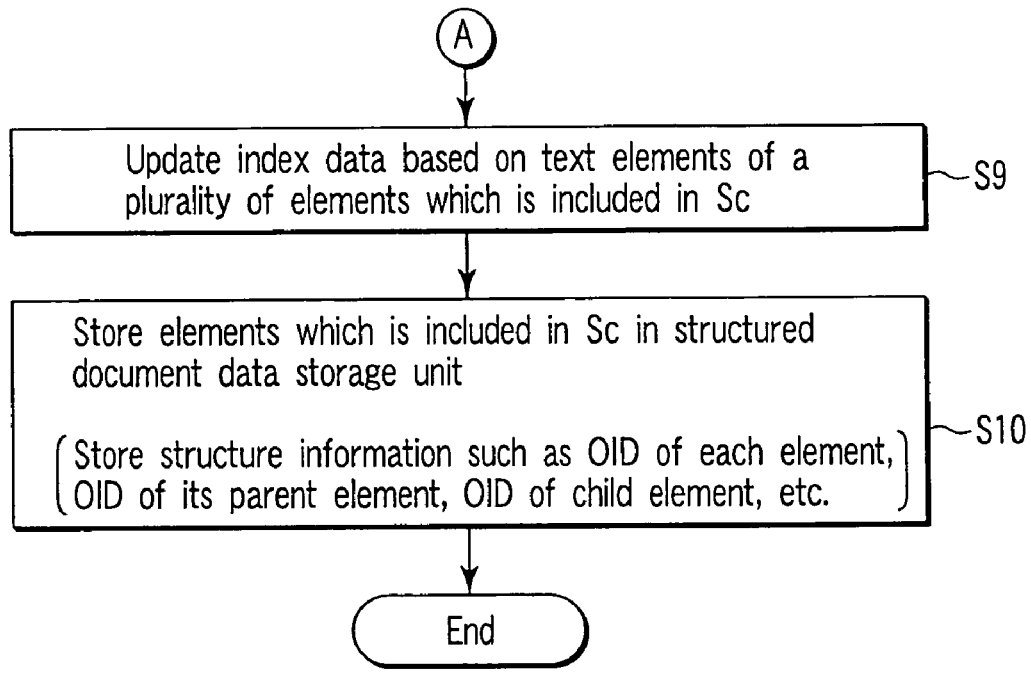
FIG. 11 is a flowchart for explaining the processing operation of the storing processing unit.
FIG. 12 shows an example of query data.

The document storing unit 34 updates the contents of the index data storage unit 114 on the basis of text elements of a plurality of elements which form Sc (step S9 in FIG. 11). A lexical item (character string) is extracted from text data of each text element, and if the extracted lexical item is not recorded in the lexical table shown in FIG. 9, that lexical item is added to the lexical table. The OID of that text element is stored to be linked with the lexical item in the lexical table, which is included in the text data of the text element.

Furthermore, the document storing unit 34 acquires an object corresponding to the OIDp given as the storage destination by scanning the structured document data storage unit 112, and adds the OIDs of respective elements of the structured document to be stored to an OID sequence indicating a set of objects of child elements of that object data. More specifically, the structured document to be stored in which the aforementioned OIDs are assigned to the respective elements is stored in the structured document storage unit 112 to be added immediately under the "bookFolder" 302 with the OIDp <1, 0, F1> (step S10 in FIG. 11).

The processing operation of the retrieval processing unit 104 in FIG. 2 will be described below.

FIG. 12 shows an example of query data to be input to the retrieval processing unit 104. The query data follows a query description method based on a query language XQuery (XML Query Language).

The query data shown in FIG. 12 describes the condition: "a hierarchical tree of a structured document DB "DB" includes a "book" element, which includes a "last" element having a text element including a character string "Tanaka" and a "last" element having a text element including a character string "Nakamura". This condition includes a so-called AND condition: the "book" element includes two elements, i.e., the "last" element having the text element including the character string "Tanaka", and the "last" element having the text element including the character string "Nakamura". On the other hand, an OR condition is that, for example, a "book" element includes at least one of a "last" element having a text element including a character string "Tanaka" and a "last" element having a text element including a character string "Nakamura".

The query data shown in FIG. 12 is transmitted from the retrieval unit 203 of the client 201 to the server 101, and is received by the request processing unit 102 of the server 101.

An outline of the processing operation of the retrieval processing unit 104 which has received the query data shown in, e.g., FIG. 12 will be described below with reference to the flowcharts shown in FIGS. 13 and 14.

The query data received by the request processing unit 102 is passed to the query parsing unit 41 of the retrieval processing unit 104. The query parsing unit 41 parses the received query data (step S101). The query structure extraction unit 42 extracts a graph structure called a query graph from the query data on the basis of the parsing result of the unit 41 (step 102).

Figure 15:
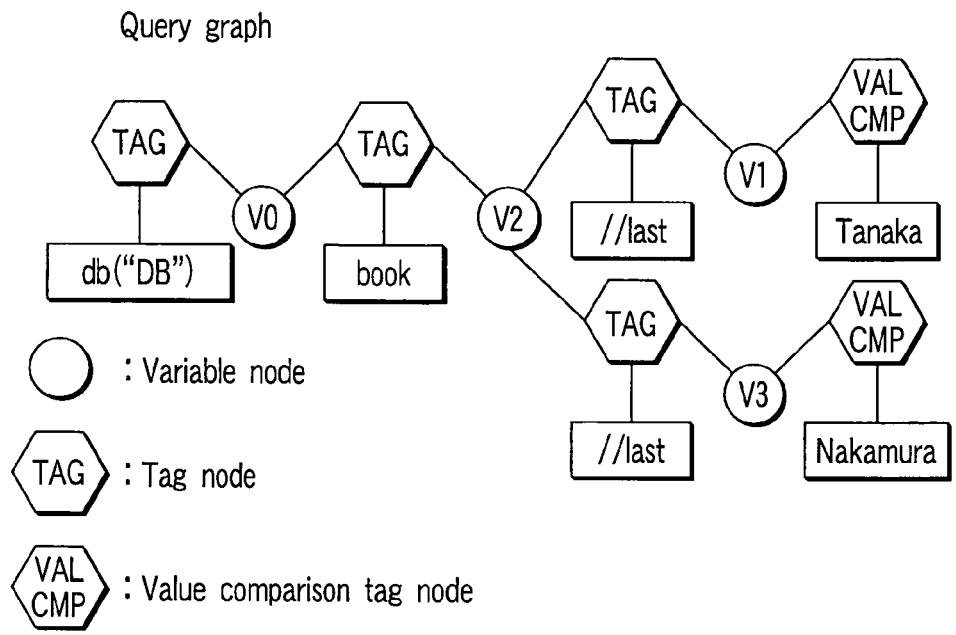
FIG. 15 shows a query graph obtained from the query data shown in FIG. 12.

For example, in case of the query data shown in FIG. 12, a query graph shown in FIG. 15 is obtained. Let Sc be the structure in the query data expressed by the query graph.

The query graph is formed by connecting variables corresponding to element names (e.g., "db "DB"", "book", "last") and character strings (e.g., "Tanaka", "Nakamura") included in the query data in accordance with the inclusive relationship of the elements and character strings included in the query data, as shown in FIG. 15.

The query structure collation unit 43 extracts a structure from the structure template storage unit 113 of the structured document DB 111. Let Sp be the extracted structure. In this case, the structure below the most upstream element of the hierarchical tree of the structured document database, i.e., the "book" element, which is designated in the query data, is extracted. The extracted structure Sp is collated with above Sc. As a result, the TIDs that can be assumed are assigned to respective elements of Sc (step S103).

The query execution unit 44 checks if the condition expressed by the query graph includes an AND condition or an OR condition. Since a process for an AND condition is a fundamental one, and that for an OR condition is a modification of that process, a detailed description of the process for an OR condition will be omitted.

The process for an AND condition generates, in turn, data which represents a combination, called a table, of values that a variable set can assume, for the purpose of embodying all variables included in the query graph. Note that a unit process for generating one table is called an operator.

It is checked if all variables included in the query graph are embodied by one table (step S104). If Yes in step S104, since a combination of values of all variables included in the query graph is embodied, that combination is output as a result. Note that the value of each variable is the OID.

If not all variables included in the query graph are embodied by one table, steps S105 to S110 are repeated until they are embodied.

It is checked in step S105 if a retrieval process using index data stored in the index data storage unit 114 can be made. If a function which is to be used lexical index data, such as "contains" or the like, is available, a high-speed retrieval process can be attained using index data in the structured document DB 111. In this case, a LexicalScanWithTid operator is executed.

Figure 14:
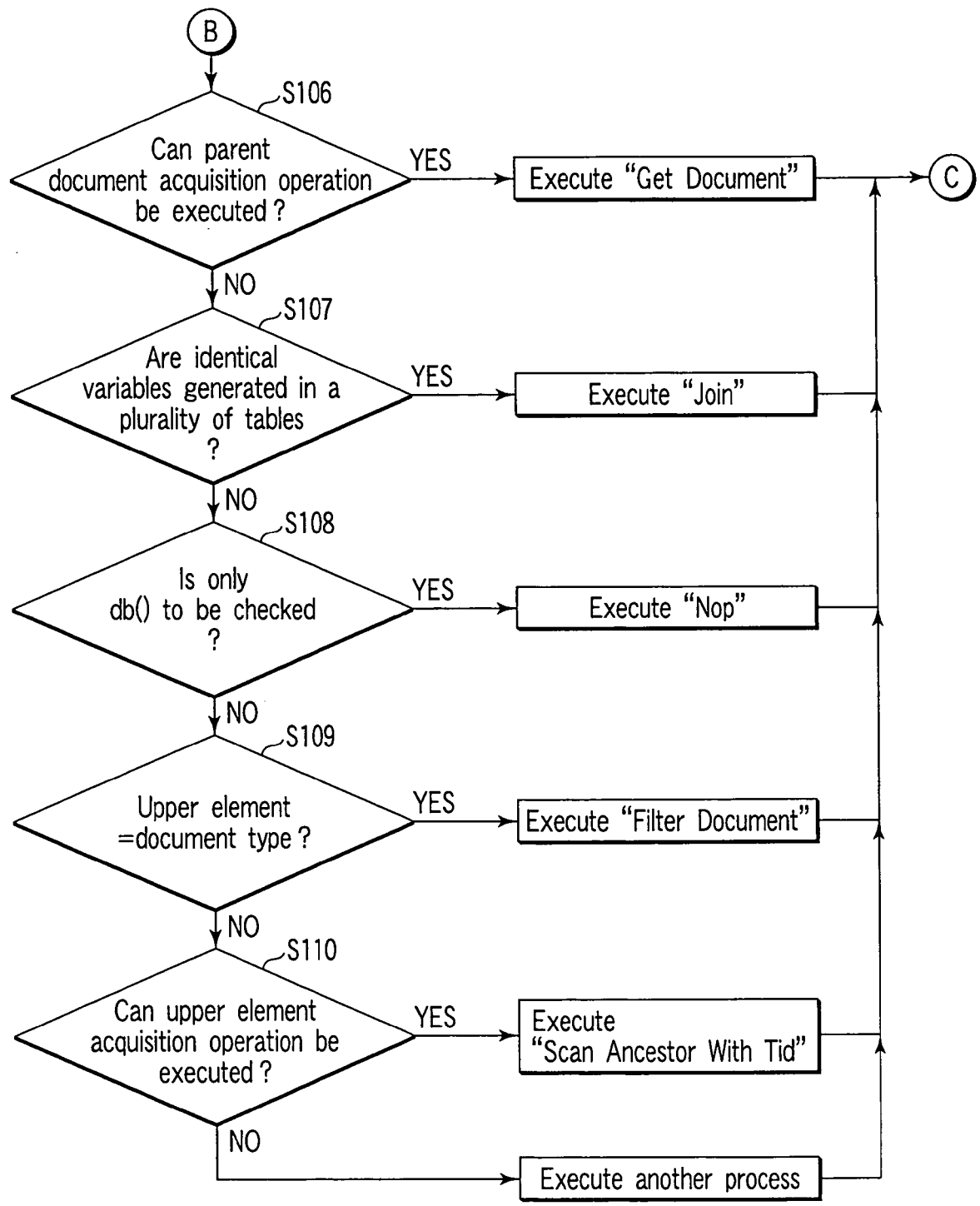
FIG. 14 is a flowchart for explaining an outline of the processing operation of the retrieval processing unit which has received the query data shown in FIG. 12.

It is checked in step S106 in FIG. 14 if a parent document acquisition operation can be made. If the parent document root OID can be directly extracted from the child element OID, a GetDocument operator is executed.

It is checked in step S107 if identical variables are generated in a plurality of tables. In such case, a Join operator is executed for two tables each.

It is checked in step S108 if all variables, the values of which are to be acquired, are embodied, and only "db( )" which is located at the head of the query data and designates the root of the database remains. In such case, a Nop operator (no operation) is executed.

It is checked in step S109 if the document type TID is assigned to a variable as an upper layer of arbitrary two variables, and the values of these two variables are embodied. In such case, a FilterDocument operator is executed.

It is checked in step S110 if a variable is present in an upper layer of variables, the variables in a lower layer are embodied, and the variable in the upper layer is not embodied. In such case, a ScanAncestorWithTid operator is executed.

In step S111, a result output process is done. In this case, combinations of values (OIDs) that respective variables can assume (a combination of OIDs) are obtained as a table. Each combination includes a plurality of OIDs having an identical document ID and, hence, the combination on the table corresponds to one structured data. By extracting structured document data corresponding to respective document IDs obtained from the combinations on the table, a set of structured document data which match the query data can be obtained.

In the query graph shown in FIG. 15, variables are expressed by nodes surrounded by circles, and variable names are described in these circles. Such nodes are called variable nodes. Also, elements designated in the query data are expressed by nodes surrounded by hexagons written with "TAG". Such nodes are called tag nodes. Furthermore, character strings designated in the query data are expressed by nodes surrounded by hexagons written with "VALCMP". Such nodes are called value comparison nodes.

Figure 16:
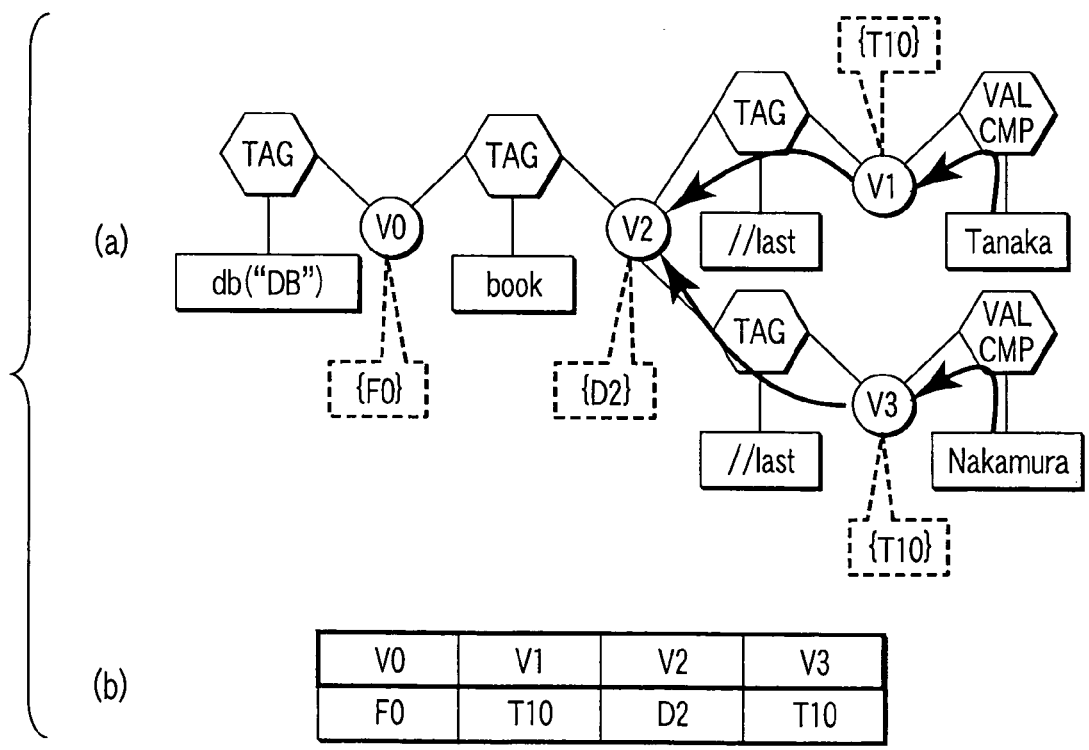
FIG. 16 is a view for explaining a retrieval process based on the query graph shown in FIG. 15.

FIG. 16 is a view for explaining the retrieval process based on the query graph in FIG. 15.

Respective variables in a query graph shown in FIG. 16(a) are assigned TIDs obtained as a result of collation between Sc and Sp in step S103 (see FIG. 16(b)). A TID set {D2} is assigned to variable V2, and a TID set {T10} is assigned to variables V1 and V3. Based on this query graph, the process for an AND condition in steps S104 to S110 is executed as follows.

(1) Since the query graph includes a value comparison tag node that can be used a "contains" function, a LexicalScanWithTid operator is executed for a character string "Tanaka". As a result, a variable node V1 is embodied (Table1 shown in FIG. 18(a)). That is, the OID corresponding to the variable node V1 is obtained.

(2) Likewise, a LexicalScanWithTid operator is executed for a character string "Nakamura". As a result, a variable node V3 is embodied (Table2 shown in FIG. 18(b)). That is, the OID corresponding to the variable node V3 is obtained.

(3) Since the variables V1 and V3 are embodied, and an upper variable V2 in the query graph is a document type node, a FilterDocument operator is executed. The FilterDocument operator executes an operation for checking the combinations of variable values in two tables (Table1, Table2 in FIGS. 18(a) and 18(b)), and if a document ID (DocID) included in only one of the two tables is found, removing that record from the table. As a result, Table1 and Table2 are obtained, as shown in FIGS. 18(c) and 18(d).

(4) Since the variable V1 is embodied, and the TID of the variable V2 is document {D2}, a parent document acquisition operation can be applied to the variable V1. A GetDocument operator is executed. As a result, the variable V2 is embodied (Table3 shown in FIG. 18(e)). That is, the OID corresponding to the variable node V2 is obtained.

(5) Likewise, a GetDocument operator is executed for the variable V3. As a result, the variable V2 is embodied (Table4 shown in FIG. 18(f)). That is, the OID corresponding to the variable node V2 is obtained.

(6) Since the variable V2 is embodied in different tables (Table3 and Table4), as described in (3) and (4), a Join Operator is executed (FIG. 18(g)).

(7) Since a variable V0 is not an output operator, an Nop operator is executed.

Figure 17:
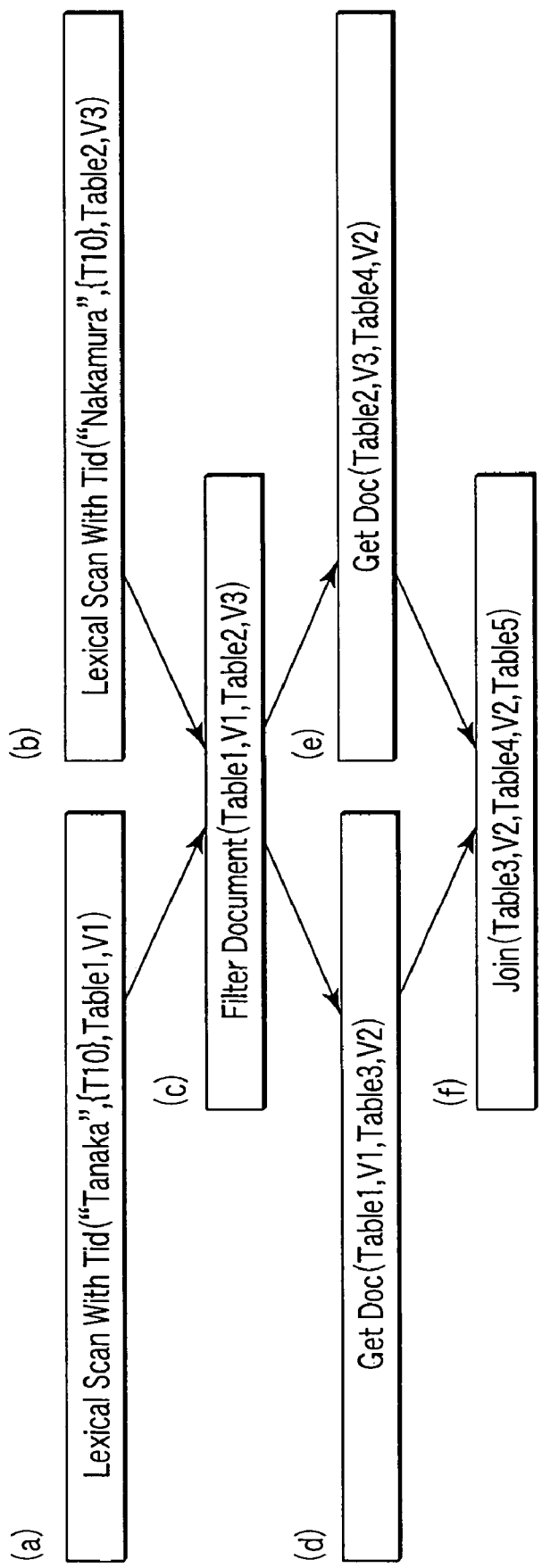
FIG. 17 shows an operator sequence used in the retrieval process based on the query graph shown in FIG. 15.

FIG. 17 shows an operator sequence described in (1) to (6) above.

Figure 18:
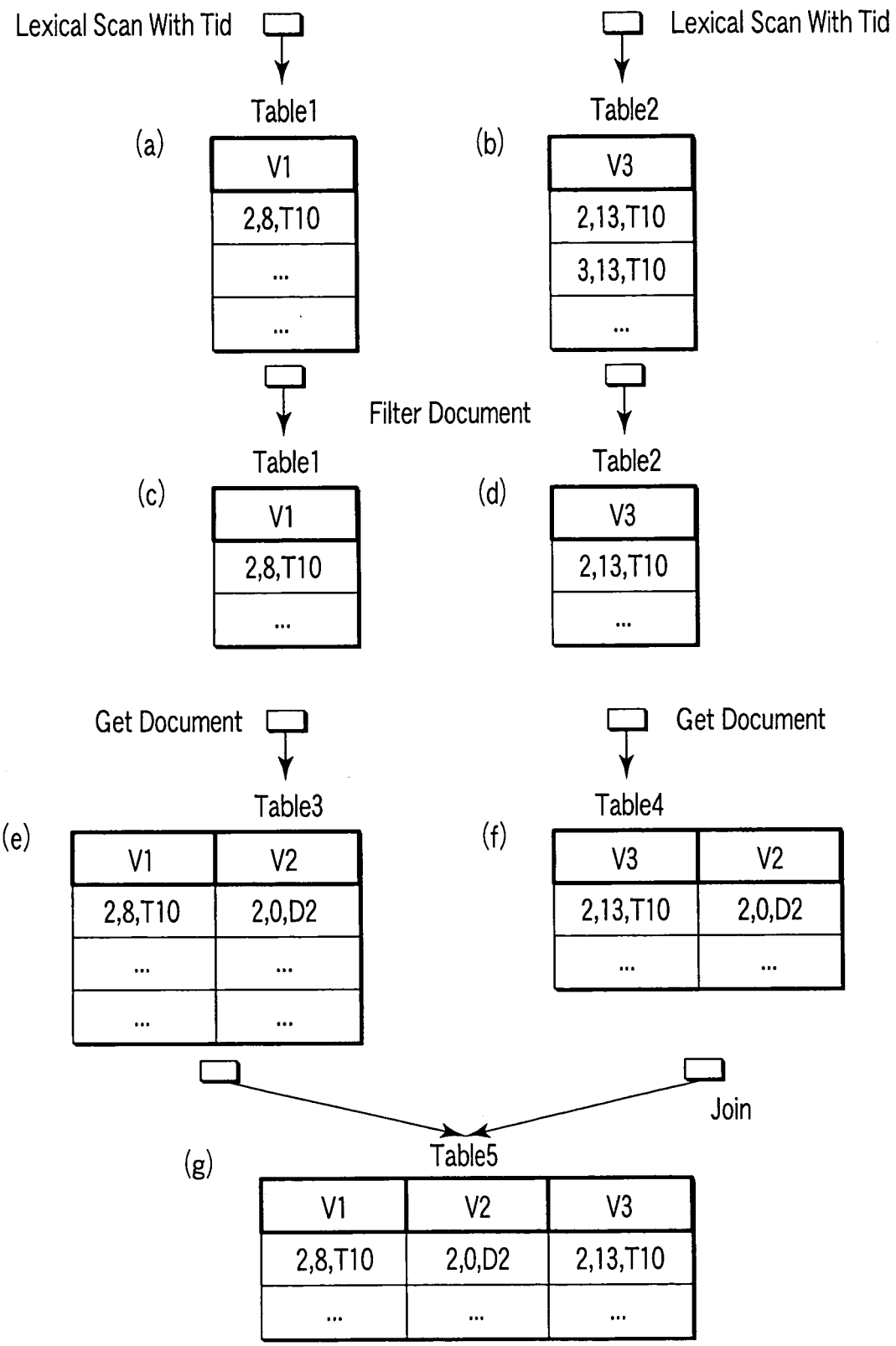
FIG. 18 is a view for explaining the processing operation based on the operator sequence shown in FIG. 17.

FIG. 18 visualizes the operator sequence in FIG. 17 in terms of operator inputs/outputs.

In Table1 in FIG. 18(a), the OID <2, 8, T10> corresponding to the variable V1 is obtained by the LexicalScanWithTid operator in FIG. 17(a).

In Table2 in FIG. 18(b), the OIDs <2, 13, T10> and <3, 13, T10> corresponding to the variable V3 are obtained by the LexicalScanWithTid operator in FIG. 17(b).

As shown in FIG. 18(d), <3, 13, T10> in Table2 is removed by the FilterDocument operator in FIG. 17(c).

As shown in FIG. 18(e), the OID <2, 0, D2> corresponding to the variable V2 is obtained from the variable V1 by the GetDocument operator for Table1 in FIG. 17(d). Note that only conversions ElemID =0 and TID=Dx are executed without changing the DocID of the OID <2, 8, T10> corresponding to the variable V1 so as to obtain the OID corresponding to the variable V2.

As shown in FIG. 18(f), the OID <2, 0, D2> corresponding to the variable V2 is obtained from the variable V3 by the GetDocument operator for Table2 in FIG. 17(e).

A combination of values that the variables V1, V2, and V3 can assume (a combination of object IDs) is obtained by the Join operator that joins Table3 and Table4 in association with the variable V2 in FIG. 17(f), as shown in Table5 in FIG. 18(g). The respective OIDs included in one combination have the same document ID. That is, a structured document including element corresponding to the respective object IDs included in this combination (that is, in case of FIG. 18(g), the structured document with the document ID="2") is output from the query execution unit 44 as a retrieval result. The retrieval result is passed from the request processing unit 102 to the client 201 as a retrieval request source. The client 201 displays the structured document received from the server 101 on the display unit 205.

A conventional retrieval process will be described below with reference to FIGS. 19 and 20 so as to explain the effects of the aforementioned retrieval process.

Figure 19:
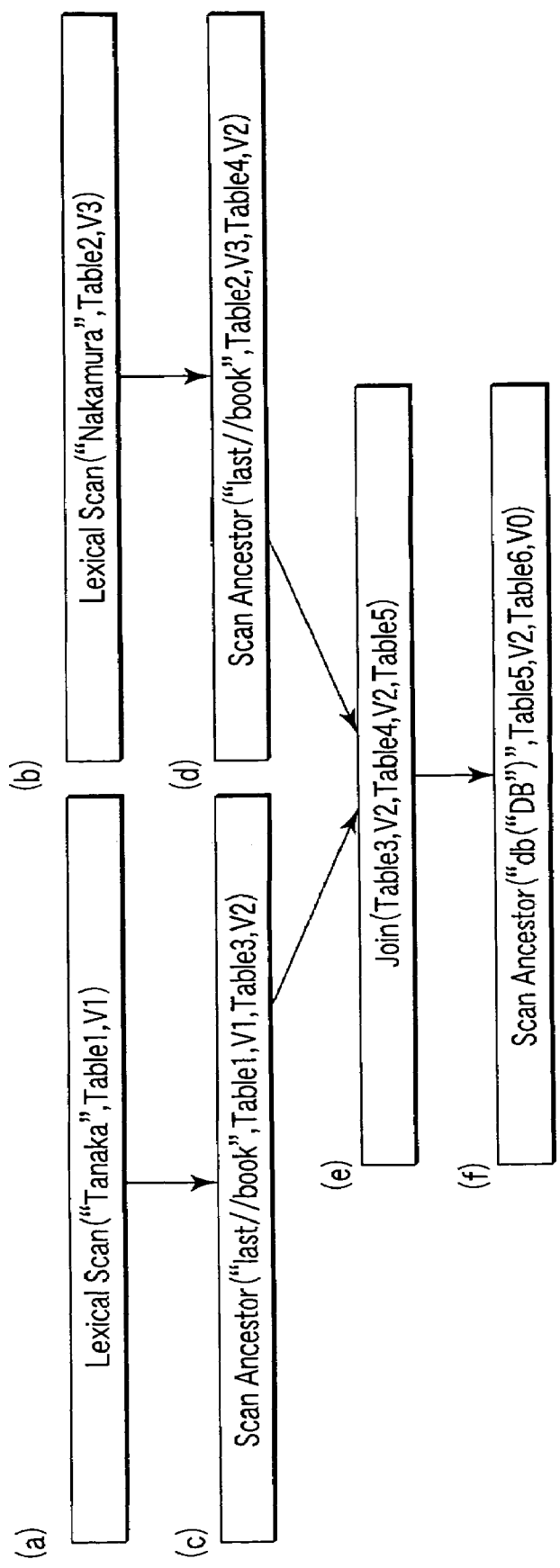
FIG. 19 shows an operator sequence based on the prior art for the query graph shown in FIG. 15.
Figure 20:
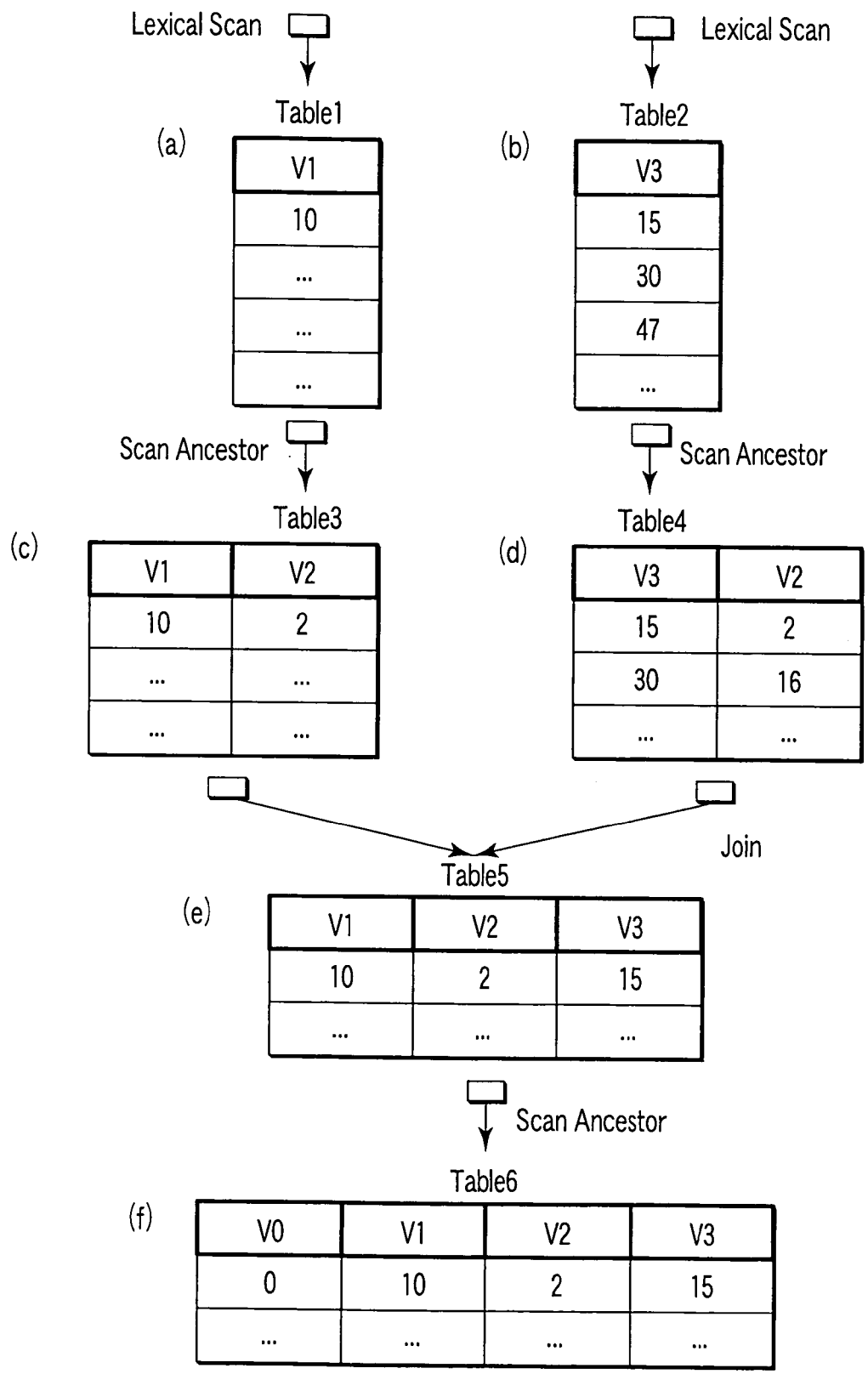
FIG. 20 is a view for explaining the processing operation based on the operator sequence shown in FIG. 19.

FIG. 19 shows an operator sequence based on the prior art for the query graph shown in FIG. 15, and FIG. 20 visualizes the operator sequence in FIG. 19 in terms of operator inputs/outputs. As shown in FIG. 19, two LexicalScan operators are executed using lexical index data to have "Tanaka" and "Nakamura" as keys. Tables obtained as a result of execution of two ScanAncestor operators are joined by a Join operator. Finally, a path condition "db ("DB")" is confirmed by a ScanAncestor operator.

A large difference between FIGS. 19 and 17 is that the operator sequence shown in FIG. 19 has no concepts of the structure template and TID. The differences of operators used in FIGS. 19 and 17 will be explained below.

The LexicalScan operator in FIG. 19 returns an OID set including a lexical item designated as an input parameter to that operator, as shown in FIGS. 20(a) and 20(b). The LexicalScanWith operator in FIG. 17 includes the TID in addition to a lexical item as input parameters, and returns an OID set including the lexical item. In this case, this operator performs filtering using the TID (the TID assigned in step S103 in FIG. 13) as the input parameter (it returns an OID set having that TID). That is, since the LexicalScanWith operator in FIG. 17 excludes unwanted OID sets since it considers the structure generated in the query data. For this reason, the subsequent processing cost can be reduced.

The ScanAncestor operator in FIG. 19 returns an upstream OID set which matches a path condition with respect to OID sets. To execute this operator, data files in the structured document DB must be scanned. As shown in FIG. 20(d), many structured document data in the structured document DB must be scanned for each of many OIDs (including unwanted OIDs) which are obtained by the LexicalScan operator and are recorded in Table 2. For example, as shown in FIG. 20(d), a scan for structured document data required to obtain a node with the OID "2" from a node with the OID "15", and a scan for structured document data required to obtain a node with the OID "16" from a node with the OID "30" are generated.

By contrast, the GetDocument operator in FIG. 17 returns an OID set of an upstream node in the same document as the respective OIDs of an OID set with respect to that OID set given as an input parameter. In this case, the given OID is converted into that of the upstream node in place of tracing the document structure of structured document data. That is, the GetDocument operator need not scan data files in the structured document DB since it considers the structure generated in the query data. For this reason, the processing cost such as disk I/O or the like can be reduced.

Figures 21, 22:
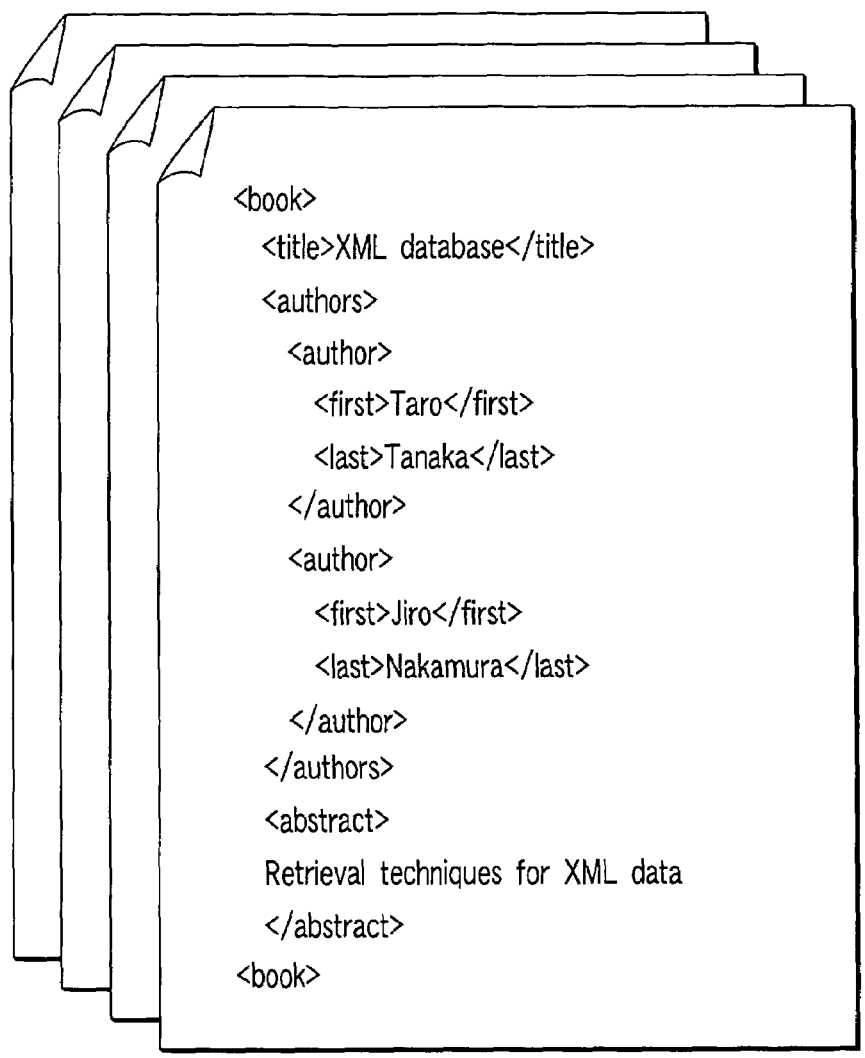
FIG. 21 shows an example of structured document data obtained as a retrieval result.
FIG. 22 shows another example of query data.

FIG. 21 shows an example of a structured document data set retrieved by the query execution unit 44 on the basis of the query data in FIG. 12. As shown in FIG. 21, each structured document data obtained as a retrieval result has an element name "book" and includes a "last" element having a text element including a character string "Tanaka" and a "last" element having a text element including a character string "Nakamura".

FIG. 22 shows another example of query data. The query data follows a query description method based on a query language XQuery (XML Query Language).

The query data shown in FIG. 22 describes the condition: "a hierarchical tree of a structured document DB "DB" includes an "authors" element, which includes a "last" element having a text element including a character string "Tanaka".

Figure 13:
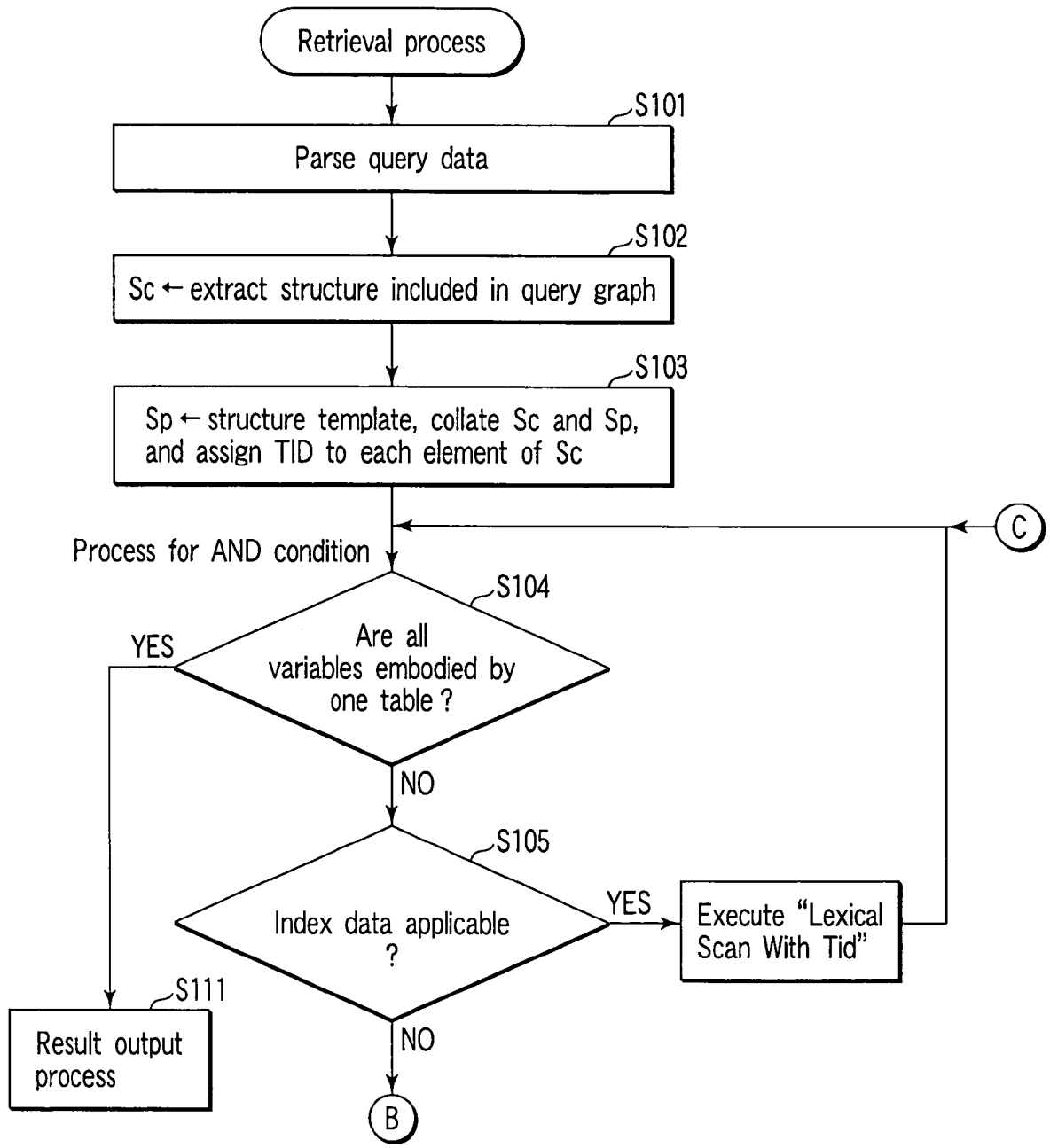
FIG. 13 is a flowchart for explaining an outline of the processing operation of a retrieval processing unit which has received the query data shown in FIG. 12.

FIG. 23 shows a query graph obtained from the query data of FIG. 22, and FIG. 24 shows the TIDs which are assigned in step S103 in FIG. 13 and correspond to respective variables in the query graph in FIG. 23.

FIG. 25 shows an operator sequence used upon executing a retrieval process on the basis of the query graph in FIG. 23. FIG. 26 visualizes the operator sequence in FIG. 15 in terms of operator inputs/outputs.

As shown in FIG. 23, the TID of the text element included in the "last" element in the "authors" element in the hierarchical tree of the structured document DB "DB" is "T10", as can also be seen from the structure template shown in FIG. 7. Also, the TID of the "authors" element in the hierarchical tree of the structured document DB "DB" is "E5", as can also be seen from the structure template shown in FIG. 7. Furthermore, the root node of the hierarchical tree of the structured document DB "DB" is "F0", as can also be seen from the structure template shown in FIG. 7.

As shown in FIG. 25(a), an OID set of a text element including a character string "Tanaka" and having the TID "T10" is obtained by a LexicalScanwithTid operator (see FIG. 26(a)). As shown in FIG. 25(b), the OID of a node which is an upstream node of the element with the OID <2, 8, T10> and has the TID "E5" is acquired based on that OID by a ScanAncestorWithTid operator. That is, the OID <2, 3, E5> is obtained (see FIG. 26(b)).

As described above, according to the above embodiment, a structure template of a hierarchical structure including a plurality of structure elements, each of which has a template ID used to identify that structure element, is stored in the structure template storage unit 113, and a plurality of structured documents each of which includes a plurality of element, which are assigned the template ID of one of the structure elements, are stored in the structured data storage unit 112.

(1) When a retrieval condition which designates a character string and a first structure element which is one of the structure elements of the hierarchical structure and includes that character string is input, structured document data including the first element which includes the character string and has a template ID corresponding to the first structure element are retrieved from the structured documents, and the retrieved structured document data is output.

(2) When a retrieval condition which designates a character string, a first structure element which is one of the structure elements of the hierarchical structure and includes that character string, and a second structure element which is another one of the structure elements of the hierarchical structure and includes the first structure element, is input, structured document data including first element which includes the character string and has a template ID corresponding to the first structure element, and second element which includes the first element and has a template ID corresponding to the second structure element is retrieved from the structured documents, and the retrieved structured document data is output.

(3) When a retrieval condition which designates a character string, a first structure element which is one of the structure elements of the hierarchical structure and includes that character string, a second structure element which is one of the structure elements of the hierarchical structure and includes the first structure element, and a third element which is one of the structure elements of the hierarchical structure and includes the first and second structure elements, is input, structured document data including first element which includes the character string and has a template ID corresponding to the first element, second element which includes the first element and has a template ID corresponding to the second structure element, and third element which includes the first and second element and has a template ID corresponding to the third structure element is retrieved from the structured documents, and the retrieved structured document data is output.

As described above, according to the above embodiment, upon obtaining an object ID set for each structure element designated as a retrieval condition, by using the template ID of each structure element that is included in a structure designated as the retrieval condition, only object IDs including the template ID of that structure element can be selected, thus allowing a high-speed retrieval process.

Each element which is included in each structured document data stored in the structured document data storage unit 112 is assigned an object ID, which includes a document ID used to identify the structured document data including that element, an element ID used to identify that element in the structured document data including the element, and a template ID of a structure element in a structure template corresponding to that element. For this reason, if the object ID of element that satisfies a retrieval condition is obtained, the object ID of its upstream element can be obtained by rewriting the element ID and template ID of that object ID. That is, upstream element in the same structured document data can be obtained without tracing the structure of structured document data. Also, the retrieval range in the structured document DB can be narrowed down in advance on the basis of the template ID and document ID included in the object ID. As a result, a high-speed retrieval process can be achieved.

The method of the present invention described in the embodiment of the present invention can be stored as a program that can be executed by a computer in a recording medium such as a magnetic disk (flexible disk, hard disk, or the like), an optical disk (CD-ROM, DVD, or the like), a semiconductor memory, or the like, and can be distributed.

What is claimed is:

1. A structured data retrieval method comprising:
storing, in a first memory, (a) a hierarchical structure formed of a plurality of nodes, and (b) a plurality of template IDs each corresponding to a node of the nodes and designating a type of the node and a location in the hierarchical structure, the type being one of a folder node, a document node, an element node, and a text node;
storing, in a second memory, a plurality of structured documents each of which includes a plurality of structure elements, each structure element corresponding to one of the document node, the element node, and the text node of the nodes, and each structure element having an object ID which includes the template ID of a corresponding node in the hierarchical structure, a document ID used to identify a structured document including the structure element, and an element ID used to identify the structure element in the structured document including the structure element;
storing, in a third memory, a plurality of index data items, each of which links one of a plurality of character strings with the object IDs of structure elements each including the one of the character strings;
inputting a query indicating a query structure including a first target node which is one of the nodes in the hierarchical structure, a second target node which is another of the nodes in the hierarchical structure and is included in the first target node, and a target character string included in the second target node;
collating the query structure with the hierarchical structure to obtain, from the hierarchical structure, a first template ID of the text node included in the second target node and a second template ID of the first target node;
retrieving a first object ID of a first structure element from the index data items, the first object ID being linked to the target character string and including the first template ID;
obtaining, from the first object ID, a second object ID of a second structure element by converting the element ID included in the first object ID into the element ID of an upstream structure element of the first structure element and converting the first template ID included in the first object ID into the second template ID, to obtain the second object ID including:
(a) the document ID included in the first object ID,
(b) the element ID of an upstream structure element of the first structure element, and
(c) the second template ID; and
outputting a structured document retrieved including the first and the second structure element.

2. A structured data retrieval method comprising:
storing, in a first memory, (a) a hierarchical structure formed of a plurality of nodes, and (b) a plurality of template IDs each corresponding to a node of the nodes and designating a type of the node and a location in the hierarchical structure, the type being one of a folder node, a document node, an element node, and a text node;
storing, in a second memory, a plurality of structured documents each of which includes a plurality of structure elements, each structure element corresponding to one of the document node, the element node, and the text node of the nodes, and each structure element having an object ID which includes the template ID of a corresponding node in the hierarchical structure, a document ID used to identify a structured document including the structure element, and an element ID used to identify the structure element in the structured document including the structure element;

storing, in a third memory, a plurality of index data items, each of which links one of a plurality of character strings with the object IDs of structure elements each including the one of the character strings;

inputting a query indicating a query structure including:
(a) a target document node which is one of the nodes in the hierarchical structure,
(b) a first and a second target element node which are nodes in the hierarchical structure and are included in the target document node,
(c) a first target character string included in the first target element node, and
(d) a second target character string included in the second target element node;

collating the query structure with the hierarchical structure to obtain, from the hierarchical structure, a first template ID of the text node included in the first target element node, a second template ID of the text node included in the second target element node, and a third template ID of the target document node;

retrieving a first object ID of a first structure element and a second object ID of a second structure element from the index data items, the first object ID being linked to the first target character string and including the first template ID, and the second object ID being linked to the second target character string and including the second template ID;

obtaining, from the first object ID and the second object ID, a third object ID of a third structure element by converting the element ID included in each of the first and the second object IDs into the element ID of an upstream structure element of each of the first and the second structure elements and converting each of the first template ID included in the first object ID and the second template ID included in the second object ID into the third template ID, to obtain the third object ID including:
(a) the document ID included in the first and the second object ID,
(b) the element ID of an upstream structure element of the first and the second structure elements, and
(c) the second template ID; and outputting a structured document retrieved including the first structure element, the second structure element, and the third structure element.

3. A structured data retrieval apparatus comprising:
a first memory to store (a) a hierarchical structure formed of a plurality of nodes, and (b) a plurality of template IDs each corresponding to a node of the nodes and designating a type of the node and a location in the hierarchical structure, the type being one of a folder node, a document node, an element node, and a text node;

a second memory to store a plurality of structured documents each of which includes a plurality of structure elements, each structure element corresponding to one of the document node, the element node, and the text node of the nodes, and each structure element having an object ID which includes the template ID of a corresponding node in the hierarchical structure, a document ID used to identify a structured document including the structure element, and an element ID used to identify the structure element in the structured document including the structure element;

a third memory to store a plurality of index data items, each of which links one of a plurality of character strings with the object IDs of structure elements each including the one of the character strings;

an input unit configured to input a query indicating a query structure including a first target node which is one of the nodes in the hierarchical structure, a second target node which is another of the nodes in the hierarchical structure and is included in the first target node, and a character string included in the second target node;

a collation unit configured to collate the query structure with the hierarchical structure to obtain, from the hierarchical structure, a first template ID of the text node included in the second target node and a second template ID of the first target node;

a retrieval unit configured to retrieve a first object ID of a first structure element from the index data items, the first object ID being linked to the target character string and including the first template ID;

an obtaining unit configured to obtain, from the first object ID, a second object ID of a second structure element by converting the element ID included in the first object ID into the element ID of an upstream structure element of the first structure element and converting the first template ID included in the first object ID into the second template ID, to obtain the second object ID including:
(a) the document ID included in the first object ID,
(b) the element ID of an upstream structure element of the first structure element, and
(c) the second template ID; and an output unit configured to output a structured document retrieved including the first and the second structure element.

4. A structured data retrieval apparatus comprising:
a first memory to store (a) a hierarchical structure formed of a plurality of nodes, and (b) a plurality of template IDs each corresponding to a node of the nodes and designating a type of the node and a location in the hierarchical structure, the type being one of a folder node, a document node, an element node, and a text node;

a second memory to store a plurality of structured documents each of which includes a plurality of structure elements, each structure element corresponding to one of the document node, the element node, and the text node of the nodes, and each structure element having an object ID which includes the template ID of a corresponding node in the hierarchical structure, a document ID used to identify a structured document including the structure element, and an element ID used to identify the structure element in the structured document including the structure element;

a third memory to store a plurality of index data items, each of which links one of a plurality of character strings with the object IDs of structure elements each including the one of the character strings;

an input unit configured to input a query indicating a query structure including:
(a) a target document node which is one of the nodes in the hierarchical structure,
(b) a first and a second target element node which are nodes in the hierarchical structure and are included in the target document node,
(c) a first target character string included in the first target element node, and
(d) a second target character string included in the second target element node;

a collation unit configured to collate the query structure with the hierarchical structure to obtain, from the hierarchical structure, a first template ID of the text node included in the first target element node, a second template ID of the text node included in the second target element node, and a third template ID of the target document node;

a retrieval unit configured to retrieve a first object ID of a first structure element and a second object ID of a second structure element from the index data items, the first object ID being linked to the first target character string and including the first template ID, and the second object ID being linked to the second target character string and including the second template ID;

an obtaining unit to obtain, from the first object ID and the second object ID, a third object ID of a third structure element by converting the element ID included in each of the first and the second object IDs into the element ID of an upstream structure element of each of the first and the second structure elements and converting each of the first template ID included in the first object ID and the second template ID included in the second object ID into the third template ID, to obtain the third object ID including:
   (a) the document ID included in the first and the second object ID,
   (b) the element ID of an upstream structure element of the first and the second structure elements, and
   (c) the second template ID; and an output unit configured to output a structured document retrieved including the first structure element, the second structure element, and the third structure element.

5. A computer readable storage medium storing instruction of a computer program which, when executed by a computer, results in performance of method comprising:

storing, in a first memory, (a) a hierarchical structure formed of a plurality of nodes, and (b) a plurality of template IDs each corresponding to a node of the nodes and designating a type of the node and a location in the hierarchical structure, the type being one of a folder node, a document node, an element node, and a text node;

storing, in a second memory, a plurality of structured documents each of which includes a plurality of structure elements, each structure element corresponding to one of the document node, the element node, and the text node of the nodes, and each structure element having an object ID which includes the template ID of a corresponding node in the hierarchical structure, a document ID used to identify a structured document including the structure element, and an element ID used to identify the structure element in the structured document including the structure element;

storing, in a third memory, a plurality of index data items, each of which links one of a plurality of character strings with the object IDs of structure elements each including the one of the character strings;

inputting a query indicating a query structure including a first target node which is one of the nodes in the hierarchical structure, a second target node which is another of the nodes in the hierarchical structure and is included in the first target node, and a target character string included in the second target node;

collating the query structure with the hierarchical structure to obtain, from the hierarchical structure, a first template ID of the text node included in the second target node and a second template ID of the first target node;

retrieving a first object ID of a first structure element from the index data items, the first object ID being linked to the target character string and including the first template ID;

obtaining, from the first object ID, a second object ID of a second structure element by converting the element ID included in the first object ID into the element ID of an upstream structure element of the first structure element and converting the first template ID included in the first object ID into the second template ID, to obtain the second object ID including:
   (a) the document ID included in the first object ID,
   (b) the element ID of an upstream structure element of the first structure element, and
   (c) the second template ID; and outputting a structured document retrieved including the first and the second structure element.

6. The computer readable storage medium according to claim 5, wherein the method further comprises:

inputting a query indicating a query structure including:
   (a) a target document node which is one of the nodes in the hierarchical structure,
   (b) a first and a second target element node which are nodes in the hierarchical structure and are included in the target document node,
   (c) a first target character string included in the first target element node, and
   (d) a second target character string included in the second target element node;

collating the query structure with the hierarchical structure to obtain, from the hierarchical structure, a first template ID of the text node included in the first target element node, a second template ID of the text node included in the second target element node, and a third template ID of the target document node;

retrieving a first object ID of a first structure element and a second object ID of a second structure element from the index data items, the first object ID being linked to the first target character string and including the first template ID, and the second object ID being linked to the second target character string and including the second template ID;

obtaining, from the first object ID and the second object ID, a third object ID of a third structure element by converting the element ID included in each of the first and the second object IDs into the element ID of an upstream structure element of each of the first and the second structure elements and converting each of the first template ID included in the first object ID and the second template ID included in the second object ID into the third template ID, to obtain the third object ID including:
   (a) the document ID included in the first and the second object ID,
   (b) the element ID of an upstream structure element of the first and the second structure elements, and
   (c) the second template ID; and outputting a structured document retrieved including the first structure element, the second structure element, and the third structure element.

* * * * *